US007910512B2

(12) United States Patent
Takahashi et al.

(10) Patent No.: US 7,910,512 B2
(45) Date of Patent: Mar. 22, 2011

(54) PRODUCTION PROCESS OF ELECTRODE CATALYST FOR FUEL CELL

(75) Inventors: Hiroaki Takahashi, Toyota (JP); Sozaburo Ohashi, Nagoya (JP); Tetsuo Kawamura, Toyota (JP); Yousuke Horiuchi, Toyota (JP); Toshiharu Tabata, Kakegawa (JP); Tomoaki Terada, Kakegawa (JP); Takahiro Nagata, Kakegawa (JP); Susumu Enomoto, Kakegawa (JP)

(73) Assignee: Cataler Corporation, Shizuoka-ken (JP)

( * ) Notice: Subject to any disclaimer, the term of this patent is extended or adjusted under 35 U.S.C. 154(b) by 0 days.

(21) Appl. No.: 12/239,234

(22) Filed: Sep. 26, 2008

(65) Prior Publication Data

US 2009/0099009 A1 Apr. 16, 2009

Related U.S. Application Data

(63) Continuation of application No. PCT/JP2007/057729, filed on Mar. 30, 2007.

(30) Foreign Application Priority Data

Mar. 31, 2006 (JP) ................................. 2006-100237

(51) Int. Cl.
*H01M 4/88* (2006.01)
*B01J 21/18* (2006.01)
*B01J 23/00* (2006.01)
*B01J 23/40* (2006.01)
*B01J 23/74* (2006.01)
*B01J 23/42* (2006.01)
*B01J 23/44* (2006.01)
*C22C 38/00* (2006.01)
*C22C 38/16* (2006.01)
*C22C 38/20* (2006.01)
*C22C 38/42* (2006.01)
*C22C 38/18* (2006.01)
*C22C 38/08* (2006.01)
*C22C 38/14* (2006.01)
*C22C 38/12* (2006.01)
*C22C 14/00* (2006.01)
*C22C 27/02* (2006.01)
*C22C 27/06* (2006.01)
*C22C 22/00* (2006.01)
*C22C 19/03* (2006.01)
*C22C 9/00* (2006.01)
*C22C 18/00* (2006.01)
*C22C 5/04* (2006.01)
*C22C 9/04* (2006.01)
*C22C 9/06* (2006.01)
*C22C 9/05* (2006.01)
*C22C 18/02* (2006.01)

(52) U.S. Cl. ........ 502/101; 502/182; 502/185; 502/326; 502/334; 502/339; 420/435; 420/417; 420/422; 420/424; 420/428; 420/434; 420/441; 420/469; 420/513; 420/420; 420/421; 420/436; 420/439; 420/440; 420/442; 420/444; 420/451; 420/452; 420/456; 420/457; 420/458; 420/459; 420/466; 420/477; 420/481; 420/482; 420/483; 420/485; 420/487; 420/492; 420/493; 420/494; 420/496; 420/497; 420/521; 420/522; 420/82; 420/89; 420/90; 420/91; 420/92; 420/93; 420/104; 420/112; 420/125; 420/126; 420/127

(58) Field of Classification Search .................. 502/101, 502/182, 185, 326, 334, 339; 420/417, 422, 420/424, 428, 434, 441, 469, 513, 420, 421, 420/439, 440, 442, 444, 451, 452, 456–459, 420/466, 477, 481–483, 485, 487, 492, 493, 420/494, 496, 497, 521, 522, 82, 89–93, 420/104, 112, 125–127, 435, 436
See application file for complete search history.

(56) References Cited

U.S. PATENT DOCUMENTS

| 2,982,741 A | * | 5/1961 | Cleaver .......................... 502/334 |
| 3,228,892 A | * | 1/1966 | Cole et al. ...................... 502/350 |
| 3,282,737 A | * | 11/1966 | Hintermann et al. ........... 429/44 |
| 3,395,049 A | * | 7/1968 | Thompson .................... 502/101 |

(Continued)

FOREIGN PATENT DOCUMENTS

JP 62-155940 7/1987

(Continued)

OTHER PUBLICATIONS

E. Puhakka et al., Comparison of Modeling and Experimental Results of Modified Pt-Based PEMFC Cathode-Catalysts, Electrochemical Society Proceedings, vol. 2002-31, pp. 74-88 (2002).

(Continued)

*Primary Examiner* — Patricia L Hailey
(74) *Attorney, Agent, or Firm* — Finnegan, Henderson, Farabow, Garrett & Dunner, LLP

(57) ABSTRACT

To provide a production process of an electrode catalyst for fuel cell whose initial voltage is high and whose endurance characteristics, especially, whose voltage drop being caused by high-potential application is less.

A production process according to the present invention of an electrode catalyst for fuel cell is characterized in that: it includes: a dispersing step of dispersing a conductive support in a solution; a loading step of dropping a platinum-salt solution, a base-metal-salt solution and an iridium-salt solution to the resulting dispersion liquid, thereby loading respective metallic salts on the conductive support as hydroxides under an alkaline condition; and an alloying step of heating the conductive support with metallic hydroxides loaded in a reducing atmosphere to reduce them, thereby alloying them.

15 Claims, 8 Drawing Sheets

U.S. PATENT DOCUMENTS

| | | | | |
|---|---|---|---|---|
| 4,052,336 | A | * | 10/1977 | van Montfoort et al. ...... 502/185 |
| 4,081,710 | A | * | 3/1978 | Heywood et al. ............. 313/141 |
| 4,139,373 | A | * | 2/1979 | Notton .......................... 420/417 |
| 4,447,506 | A | * | 5/1984 | Luczak et al. .................. 429/44 |
| 4,613,582 | A | * | 9/1986 | Luczak et al. ................ 502/185 |
| 4,677,092 | A | * | 6/1987 | Luczak et al. ................ 502/185 |
| 4,716,087 | A | * | 12/1987 | Ito et al. ......................... 429/40 |
| 5,013,618 | A | | 5/1991 | Luczak |
| 5,521,020 | A | | 5/1996 | Dhar |
| 5,767,036 | A | * | 6/1998 | Freund et al. ................ 502/185 |
| 6,663,998 | B2 | * | 12/2003 | Nørskov et al. ................ 429/40 |
| 7,166,330 | B2 | * | 1/2007 | Takahashi et al. ......... 427/372.2 |
| 7,318,977 | B2 | * | 1/2008 | He et al. .......................... 429/44 |
| 2003/0044655 | A1 | | 3/2003 | Kato et al. |
| 2004/0037770 | A1 | * | 2/2004 | Fischer et al. ................ 423/584 |
| 2005/0194066 | A1 | * | 9/2005 | Duruz et al. ................... 148/241 |
| 2007/0026292 | A1 | * | 2/2007 | Adzic et al. ..................... 429/44 |
| 2007/0259251 | A1 | * | 11/2007 | He et al. .......................... 429/40 |
| 2007/0298961 | A1 | * | 12/2007 | Rice et al. ..................... 502/101 |

FOREIGN PATENT DOCUMENTS

| | | | |
|---|---|---|---|
| JP | 4-18933 | | 1/1992 |
| JP | 8-203537 | | 8/1996 |
| JP | 10-92441 | | 4/1998 |
| JP | 10-162839 | | 6/1998 |
| JP | 2928586 | | 5/1999 |
| JP | 11-273690 | | 10/1999 |
| JP | 2002-200427 | | 7/2002 |
| JP | 2002-248350 | | 9/2002 |
| JP | 3353518 | | 9/2002 |
| JP | 2003-24798 | | 1/2003 |
| JP | 2003-45442 | | 2/2003 |
| JP | 2005-317373 | | 11/2005 |
| JP | 2006-32287 | | 2/2006 |
| JP | 2006-127979 | | 5/2006 |
| KR | 10-2005-0031017 | * | 4/2005 |
| WO | WO 2006/046453 | | 5/2006 |
| WO | 2007/114525 | * | 10/2007 |

OTHER PUBLICATIONS

Liang, Y. et al., "Preparation and characterization of carbon-supported PtRuIr catalyst with excellent CO-tolerant performance for proton-exchange membrane fuel cells," Journal of Catalysis, vol. 238, (2006), pp. 468-476.

Extended European Search Report for EP 07741165.0, dated Nov. 5, 2009.

Puhakka, Eini et al., "Comparison of Modeling and Experimental Results of Modified Pt-Based PEMFC Cathode-Catalysts," Electrochemical Society Proceedings, pp. 74-88, vol. 2002-31, Jan. 1, 2002.

Supplemental European Search Report for EP 07740800.3, dated Jun. 1, 2010.

* cited by examiner

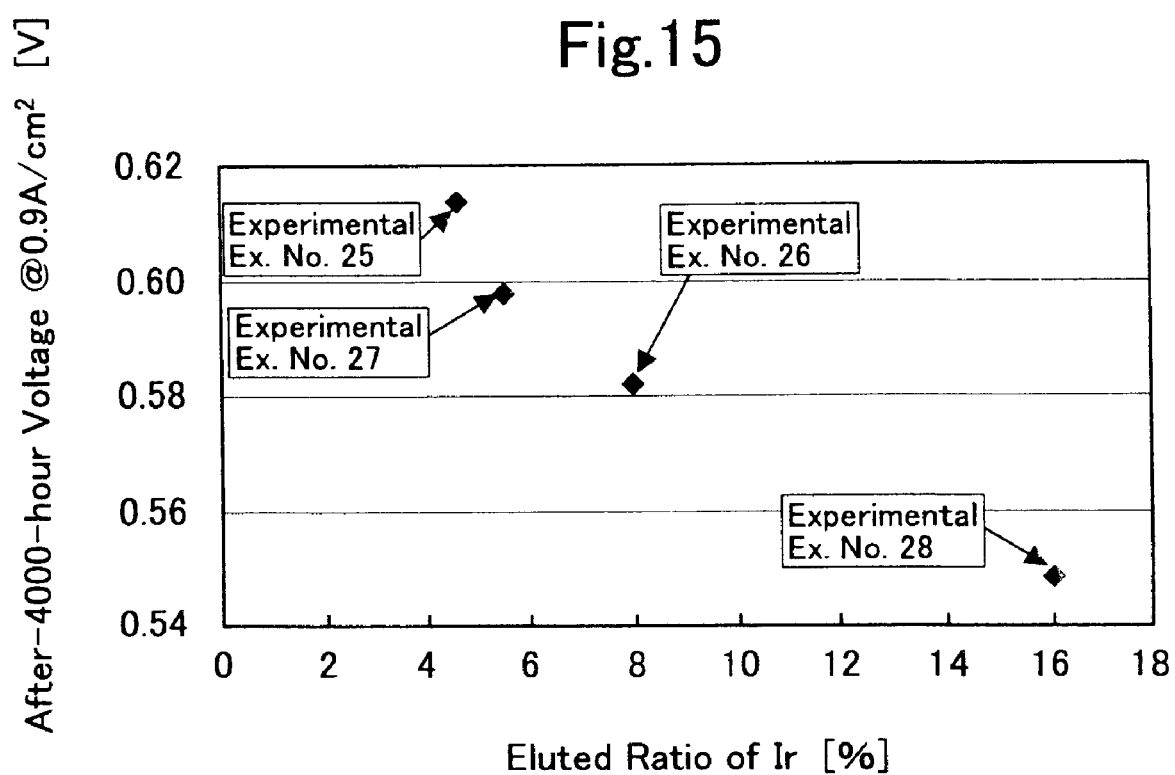

US 7,910,512 B2

PRODUCTION PROCESS OF ELECTRODE CATALYST FOR FUEL CELL

This is a continuation of PCT application PCT/JP2007/057729 filed Mar. 30, 2007, which in turn is based on Japanese application 2006-100237 filed Mar. 31, 2006, the entire contents of each of which is incorporated herein by reference.

TECHNICAL FIELD

The present invention relates to a production process of an electrode catalyst for fuel cell whose initial voltage is high, and which is good in terms of endurance characteristic.

BACKGROUND ART

In a fuel cell in which electrode catalyst layers being completed by laminating supports with catalysts loaded are adhered to a solid polymer-electrolyte membrane that has selective permeability to hydrogen ion; and in which the solid polymer-electrolyte membrane and the electrode catalyst layers are held by a pair of gas diffusible electrodes while interposing them therebetween, electrode reactions, which are expressed by reaction equations being specified below, develop at both electrodes (anode and cathode), which hold the solid polymer-electrolyte membrane between them, depending on their polarities, thereby obtaining electric energy.

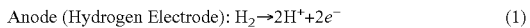

Anode (Hydrogen Electrode): $H_2 \rightarrow 2H^+ + 2e^-$    (1)

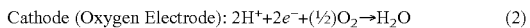

Cathode (Oxygen Electrode): $2H^+ + 2e^- + (\tfrac{1}{2})O_2 \rightarrow H_2O$    (2)

Humidified hydrogen or a fuel gas including hydrogen passes through the anode gas diffusion layer being an electricity collector as well, and then arrives at the catalytic layer, and thereby the reaction of equation (1) occurs. The hydrogen ions $H^+$ that are generated at the anode by means of the reaction of equation (1) permeate (diffuse through) the solid polymer-electrolyte membrane, and then move toward the cathode being accompanied by water molecules. Simultaneously therewith, the electrons e- that are generated at the anode pass through the catalytic layer and gas diffusion layer (electricity collector), then pass through a load that is connected between the anode and the cathode by way of an external circuit, and eventually move to the cathode.

On the contrary, at the cathode, an oxidizing-agent gas including humidified oxygen passes through the cathode gas diffusion layer being an electricity collector as well, reaches the catalytic layer, and then receives electrons that have flowed from the external circuit through the gas diffusion layer (electricity collector) and catalytic layer so that it is reduced by the reaction of equation (2), and eventually combines with the protons H+ that have flowed from the anode through the electrolyte membrane to turn into water. A part of the generated water comes into the electrolyte membrane by means of concentration gradient, diffuses toward the fuel electrode to move thereto, and another part thereof evaporates, then diffuses to a gas passage through the catalytic layer and gas diffusion layer, and is eventually discharged together with the unreacted oxidizing-agent gas.

Thus, at both of the anode side and cathode side, the condensation resulting from water occurs to cause the flooding phenomenon, and thereby there is a problematic point in that the electric-power generation performance might be impaired.

On the other hand, for the downsizing of fuel-cell system, making it produce a high output in high current-density load region is necessary and indispensable. In Patent Literature No. 1 and the like being mentioned below, investigations on the performance in high current-density load region were carried out by means of binary system or ternary system alloy catalysts of platinum with transition metal elements.

Moreover, as a catalyst for fuel cell, various platinum-cobalt system catalysts have been studied by UTC Fuel Cells Corporation, and their presentations have been made at academic conferences. According to those, it is said that, in platinum-cobalt binary catalysts, the cell voltages are higher than those in the other platinum-cobalt system catalysts; especially, this tendency is said to be strong in high current-density load region.

Patent Literature No. 1: Japanese Unexamined Patent Publication (KOKAI) Gazette No. 2003-24,798;

Patent Literature No. 2: Japanese Patent Gazet to No. 2, 928, 586;

Patent Literature No. 3: Japanese Patent Gazette No. 3,353518; and

Patent Literature No. 4: Japanese Unexamined Publication (KOKAI) Gazette No. 10-162,839

DISCLOSURE OF THE INVENTION

Assignment to be Solved by the Invention

However, in the binary system or ternary system alloy catalysts being set forth in Patent Literature No. 1, and the like, there is a problem in that performance degradation might occur because of the increase of the amount of generated water (flooding phenomenon) by means of making them highly-active. Further, the decline of reaction area because of the sintering of catalytic metal, the deterioration of catalytic activity because of the elution of catalytic metal and so forth, or the durability degradation of catalyst because of the deterioration of support by means of the oxidation of carbon that results from high potential might become problems.

The present invention has been done in order to solve the aforementioned problematic points, and aims at providing a production process of an electrode catalyst for fuel cell whose initial voltage is high and whose endurance characteristics, especially, whose voltage drop being caused by high-potential application is less.

Means for Solving the Assignment and Effect

A production process according to the present invention of an electrode catalyst for fuel cell is characterized in that it includes: a dispersing step of dispersing a conductive support in a solution; a loading step of dropping a platinum-salt solution, a base-metal-salt solution and an iridium-salt solution to the resulting dispersion liquid, thereby loading respective metallic salts on the conductive support as hydroxides under an alkaline condition; and an alloying step of heating the conductive support with metallic hydroxides loaded in a reducing atmosphere to reduce them, thereby alloying them. In this production process, it is possible to produce an electrode catalyst for fuel cell whose initial voltage is high and whose endurance characteristics, especially, whose voltage drop being caused by high-potential application is less.

Between the loading step and alloying step of this production process, it is preferable to perform a washing step of filtering, washing and drying the conductive support with metallic hydroxides loaded. The performance degradation of catalyst being caused by the intermingling of impurities can be suppressed.

As for the conductive support that is employed in this production process, it is possible to employ carbon such as carbon black and high specific-surface-area carbon. Moreover, as for a base metal of the base-metal solution, it is possible to employ one or more members of base metals being selected from the group consisting of titanium, zirconium, vanadium, chromium, manganese, iron, cobalt, nickel, copper and zinc; in particular, cobalt is preferable.

A compositional ratio (molar ratio) between the platinum element in the platinum-salt solution, the base-metal element in the base-metal-salt solution and the iridium element in the iridium-salt solution, platinum-salt solution, base-metal-salt solution and iridium-salt solution which are employed in this production process, can preferably be platinum:base-metal element:iridium=1:0.01-2:0.01-2. In particular, it is preferable that, in view of adapting it into a catalyst that possesses a much better durability, the compositional ratio (molar ratio) between them can preferably fall in a range of platinum:base-metal element:iridium=1:0.07-1:0.01-0.3. Moreover, it is preferable that an amount of the carbon, which constitutes the conductive support, and a loading amount of platinum in reducing-type catalytic particles, which are loaded on this carbon, can make a mass proportion, platinum/carbon, which is 0.6-1.7. Furthermore, it is preferable that the particle diameters of the reducing-type catalytic particles being obtained at the alloying step can be 3-6 nm.

Moreover, it is preferable that the alloying step of this production process can include a step of treating it at a temperature of 700-900° C. in an inert atmosphere. In particular, it is more preferable that the temperature can be adapted into being 800° C. In addition, it is preferable that said inert atmosphere can be at least one member selected from the group consisting of a nitrogen atmosphere, an argon atmosphere and a helium atmosphere; moreover, it is more preferable that it can be adapted into being an argon atmosphere.

It is preferable to include, after the alloying step of this production process, a surface treatment step of treating the conductive support with metallic catalysts loaded that has been obtained at the alloying step with a reducing acid, and thereafter treating it with an oxidizing acid. In this case, it is preferable that, in the surface treatment step, the reducing acid can be at least one member selected from the group consisting of formic acid and oxalic acid; and the oxidizing acid can be at least one member selected from the group consisting of hydrochloric acid, nitric acid and sulfuric acid; moreover, it is more preferable that the reducing acid can be formic acid; and the oxidizing acid can be nitric acid.

EFFECT OF THE INVENTION

A fuel cell using a ternary system catalyst, which is obtainable with the production process according to the present invention and which comprises platinum, a base-metal element and iridium, can be adapted into a fuel cell whose initial voltage is high and whose endurance characteristics, especially, whose voltage drop being caused by high-potential application is less.

BRIEF DESCRIPTION OF THE DRAWINGS

FIG. 15 is a diagram for illustrating relationships between eluted Ir ratios of Experimental Example Nos. 25-28 and voltage values thereof @0.9 A/cm$^2$ after 4,000-hour load-fluctuated endurance test.

BEST MODE FOR CARRYING OUT THE INVENTION

Figure 1:
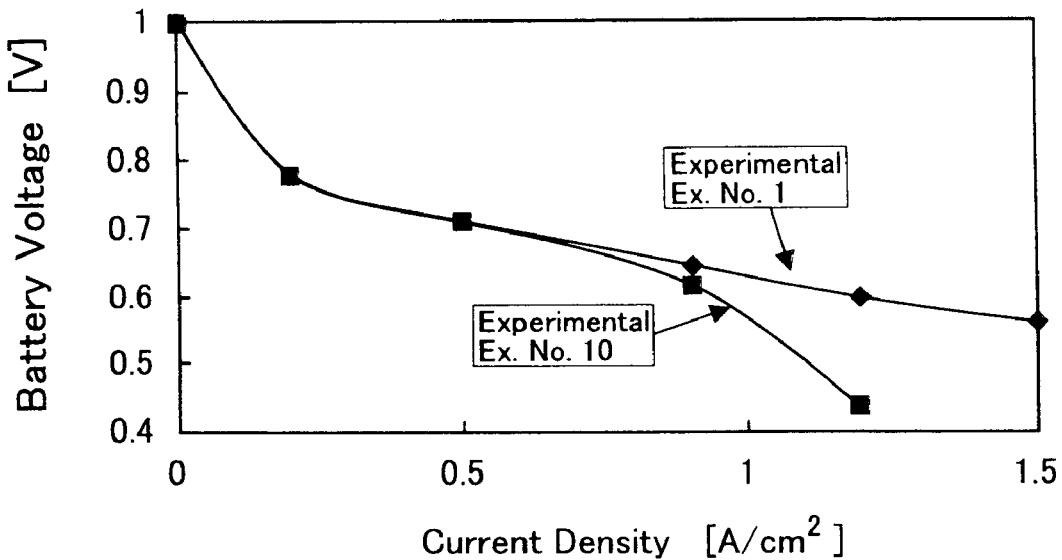
FIG. 1 is a curve-chart diagram for illustrating a current/voltage characteristic of a single cell that was made employing a catalyst of Experimental Example No. 1, and a current/voltage characteristic of a single cell that was made utilizing a catalyst of Experimental Example No. 10.

As for the conductive support that is employed in the production process according to the present invention, it is possible to employ one or more members of carbon, which is selected from the group consisting of carbon black, graphite, activated carbon and carbon nano tubes. Moreover, a fuel cell, which is manufactured employing a catalyst that is obtained by the production process according to the present invention, is not limited at all, and it is possible to employ for it those which possess structures, materials and functions that have been known so far conventionally. For example, as for the solid polymer electrolyte, it can be any of those that function as an electrolyte in polymer electrolyte fuel cell. In particular, perfluorosulfonic acid type polymers are suitable; although Nafion (produced by DuPont de Nermours Co.), Flemion (produced by ASAHI GARASU Co., Ltd.), Aciplex (produced by ASAHI KASEI KOGYO Co., Ltd.), and the like, can be exemplified preferably, it is not limited to these. This fuel-cell battery can be adapted into those that are provided with an anode and a cathode for interposing a polymer electrolyte membrane therebetween, an anode-side conductive separator plate having a gas passage for supplying fuel gas to the anode, and additionally a cathode-side separator plate having a gas passage for supplying oxidizing-agent gas to said cathode.

EXAMPLES

Hereinafter, experimental examples according to the present invention will be explained.

Experimental Example No. 1

4.71 g of a commercially available high-specific-surface-area carbon powder was added to 0.5 L pure water, and was dispersed therein. To this dispersion liquid, a hexahydroxo platinum nitrate solution including 4.71 g platinum, a cobalt nitrate aqueous solution including 0.529 g cobalt, and an iridium chloride aqueous solution including 0.232 g iridium were added in this order respectively, and were broken in fully with the carbon. To this f about 5 mL of 0.0 1N ammonia was added to make the pH be about 9, thereby forming the respective hydroxides to precipitate them on the carbon. A powder, which was obtained by filtering and washing this dispersion liquid, was vacuum dried at 100° C. for 10 hours.

Next, after it was held at 500° C. for 2 hours in hydrogen gas to subject it to a reducing treatment, it was held at 900° C. for 2 hours in nitrogen gas to alloy them. Further, after this catalytic powder was stirred in 0.5 L of 1N hydrochloric acid to remove about 40% by weight unalloyed cobalt by acid washing, it was washed with pure water repeatedly.

In the obtained carbon catalytic powder with platinum alloy loaded, the loading density of platinum was 45.5% by weight, the loading density of cobalt was 3.4% by weight, and the loading density of iridium was 5.6% by weight. The atomic molar ratio between the respective elements was Pt:Co:Ir=1:0.25:0.05. When the XRD was measured, only the peak of Pt was observed, and the formation of disordered alloys was confirmed from the peak shift in the (111) plane of Pt at around 39° C. Further, when the average particle diameter was computed from the peak position in the (111) plane of Pt and the half-value width, it was 5.2 nm. The physical-property values of the obtained catalytic powder are summarized in Table 1 below.

Experimental Example Nos. 2-9

In order to investigate the influence of the molar ratio of cobalt when the mass proportion of Pt to carbon was fixed constant at 1.0, catalytic powders were prepared in the same manner as Experimental Example No. 1 except that the molar ratio of cobalt was adapted into being as set forth below.

Experimental Example No. 2: (Product's Molar Ratio, Pt:Co:Ir=1:0:0.05), Fed Amount: 4.88 g Platinum, and 0.24 g Iridium Experimental Example No. 3: (Product's Molar Ratio, Pt:Co:Ir=1:0.003:0.05), Fed Amount: 4.88 g Platinum, 0.007 g Cobalt, and 0.24 g Iridium Experimental Example No. 4: (Product's Molar Ratio, Pt:Co:Ir=1:0.01:0.05), Fed Amount: 4.87 g Platinum, 0.025 g Cobalt, and 0.24 g Iridium Experimental Example No. 5: (Product's Molar Ratio, Pt:Co:Ir=1:0.05:0.05), Fed Amount: 4.84 g Platinum, 0.122 g Cobalt, and 0.239 g Iridium Experimental Example No. 6: (Product's Molar Ratio, Pt:Co:Ir=1:0.07:0.05), Fed Amount: 4.83% Platinum, 0.17 g Cobalt, and 0.238 g Iridium Experimental Example No. 7: (Product's Molar Ratio, Pt:Co:Ir=1:1:0.05), Fed Amount: 4.25 g Platinum, 2.14 g Cobalt, and 0.21 g Iridium Experimental Example No. 8: (Product's Molar Ratio, Pt:Co:Ir=1:2:0.05), Fed Amount: 3.77% Platinum, 3.78 g Cobalt, and 0.186 g Iridium Experimental Example No. 9: (Product's Molar Ratio, Pt:Co:Ir=1:5:0.05), Fed Amount: 2.81 g Platinum, 7.07 g Cobalt, and 0.138 g Iridium The physical-property values of the obtained catalytic powders according to Experimental Example Nos. 1-9 were summarized in Table 1 below.

Experimental Example Nos. 10-16

In order to investigate the influence of the molar ratio of iridium when the mass proportion of Pt to carbon was fixed constant at 1.0, catalytic powders were prepared in the same manner as Experimental Example No. 1 except that the molar ratio of iridium was adapted into being as set forth below.

Experimental Example No. 10: (Catalytic Powder's Pt:Co:Ir=1:0.25:0), Fed Amount: 4.82 g Platinum, and 0.606 g Cobalt Experimental Example No. 11: (Catalytic Power's Pt:Co:Ir=1:0.25:0.0025), Fed Amount: 4.81 g Platinum, 0.606 g Cobalt, and 0.012 g Iridium Experimental Example No. 12: (Catalytic Powder's Pt:Co:Ir=1:0.25:0.0125), Fed Amount: 4.79 g Platinum, 0.603 g Cobalt, and 0.059 g Iridium Experimental Example No. 13: (Product's Molar Ratio, Pt:Co:Ir=1:0.25:0.3), Fed Amount: 3.89 g Platinum, 0.49 g Cobalt, and 1.92 g Iridium Experimental Example No. 14: (Catalytic Powder's Pt:Co:Ir=1:0.25:1), Fed Amount: 3.27 g Platinum, 0.411 g Cobalt, and 3.219 g Iridium Experimental Example No. 15: (Catalytic Powder's Pt:Co:Ir=1:0.25:1.5), Fed Amount: 3.14 g Platinum, 0.18 g Cobalt, and 4.58 g Iridium Experimental Example No. 16: (Product's Molar Ratio, Pt:Co:Ir:=1:0.25:3), Fed Amount: 2.16 g Platinum, 0.12 g Cobalt, and 6.28 g Iridium The physical-property values of the obtained catalytic powders according to Experimental Example Nos. 10-16 were summarized in Table 1 below.

Experimental Example Nos. 17-20

Next, in order to investigate the influence of the mass proportion of Pt to carbon when the molar ratio between the catalytic metals was fixed, catalytic powders were prepared in the same manner as Experimental Example No. 1 except that the mass proportion of Pt to carbon was adapted into being as set forth below.

Experimental Example No. 17: (Catalytic Powder's Pt/C=0.5/1), Fed Amount: 3.20 g Platinum, 0.403 g Cobalt, and 0.158 g Iridium Experimental Example No. 18: (Catalytic Powder's Pt/C=0.8/1), Fed Amount: 4.21 g Platinum, 0.53 g Cobalt, and 0.207 g Iridium Experimental Example No. 19: (Catalytic Powder's Pt/C=1.5/1), Fed Amount: 5.58 g Platinum, 0.275 g Cobalt, and 0.703 g Iridium Experimental Example No. 20: (Catalytic Powder's Pt/C=1.8/1), Fed Amount: 5.95 g Platinum, 0.749 g Cobalt, and 0.293 g Iridium The physical-property values of the obtained catalytic powders according to Experimental Example Nos. 17-20 were summarized in Table 1 below.

Experimental Example Nos. 21-28

Next, in order to investigate the influence of alloying process, catalytic powders were prepared while changing the alloying temperature and the method of acid treatment.

The procedures were followed in the same manner as Experimental Example No. 1 except that the iridium chloride aqueous solution including 0.232 g iridium that was dropped to the dispersion liquid was adapted into an iridium nitrate aqueous solution including 0.232 g iridium, and that the alloying method and acid treatment after carrying out the vacuum drying at 100° C. for 10 hours were adapted into being as set forth below.

Experimental Example No. 21: the resultant powder was held at 800° C. for 2 hours in an Ar gas atmosphere to carry out alloying; and was thereafter stirred in 0.5 L of 1N hydrochloric acid to remove about 40% by weight of unalloyed cobalt by acid washing; and was thereafter washed with pure water repeatedly.

Experimental Example No. 22: the procedures were followed in the same manner as Experimental Example No. 21 except that the resultant powder was held at 700° C. for 2 hours in an Ar gas atmosphere to carry out alloying.

Experimental Example No. 23: the procedures were followed in the same manner as Experimental Example No. 21 except that the resultant powder was held at 900° C. for 2 hours in an Ar gas atmosphere to carry out alloying.

Experimental Example No. 24: the procedures were followed in the same manner as Experimental Example No. 1 except that the iridium chloride aqueous solution including 0.232 g iridium that was dropped to the dispersion liquid was adapted into an iridium nitrate aqueous solution including 0.232 g iridium.

Experimental Example No. 25: the resultant powder was held at 800° C. for 2 hours in an Ar gas atmosphere to carry out alloying; and thereafter the catalytic powder, which was after being stirred in 0.5 L of 1N formic acid and then being filtered, was stirred in 0.5 L of 0.5N nitric acid, thereby removing about 40% by weight of unalloyed cobalt by acid washing; and was thereafter washed with pure water repeatedly.

Experimental Example No. 26: the procedures were followed in the same manner as Experimental Example No. 25 except that the resultant powder was held at 700° C. for 2 hours in an Ar gas atmosphere to carry out alloying.

Experimental Example No. 27: the procedures were followed in the same manner as Experimental Example No. 25 except that the resultant powder was held at 900° C. for 2 hours in an Ar gas atmosphere to carry out alloying.

Experimental Example No. 28: the procedures were followed in the same manner as Experimental Example No. 25 except that the catalytic powder was not stirred in 0.5 L of 1N formic acid.

The physical-property values of the obtained catalytic powders according to Experimental Example Nos. 21-28 were summarized in Table 2 and Table 3 below.

Moreover, in order to examine the acid resistance of the obtained catalysts, the eluted Co amounts of Experimental Example Nos. 21-24 were measured. In addition, the eluted Ir amounts of Experimental Example Nos. 25-28 were measured. As for the eluted Co amounts, the obtained catalysts were stirred in 0.5N sulfuric acid for 7 days, and they were thereafter filtered, and then Co amounts that eluted into the filtrates were measured with IPC, thereby finding the eluted concentrations of Co. As for the eluted Ir amounts, the obtained catalysts were subjected to a ultrasonic wave for 30 minutes in 0.5 N sulfuric acid, and they were thereafter filtered, and then Ir amounts that eluted into the filtrates were measured with IPC, thereby finding the eluted concentrations of Ir. Each of the results is set forth in Table 2 and Table 3.

[Fuel-cell Performance Evaluation]

Using the obtained carbon catalyst with platinum loaded according to Experimental Example Nos. 1-28, single-cell electrodes for polymer electrolyte fuel cell were formed in the following manner. First of all, the carbon catalyst powders with platinum loaded were dispersed in an organic solvent, and then the resultant dispersion liquids were coated onto a Teflon (trade name) sheet, thereby forming catalytic layers. The amount of Pt catalyst per 1 $cm^2$ electrode surface area was 0.4 mg. Electrodes, which were formed of these carbon catalyst powders with platinum loaded, were put together by means of hot pressing with a polymer electrolyte membrane being interposed therebetween, respectively, and then diffusion layers were installed on their opposite sides, thereby forming single-cell electrodes.

The current/voltage characteristics were measured while supplying humidified air, which was passed through a bubbler being heated to 70° C., in an amount of 1 L/min. to the cathode-side electrodes of the single cells using the catalyst according to Experimental Example Nos. 1-20; and supplying humidified hydrogen, which was passed through a bubbler being heated to 85° C. f in an amount of 0.5 L/min. to the anode-side electrodes. Moreover, the influence of cobalt and iridium molar ratios was compared by the voltage values at 0.9 $A/cm^2$ current density after the current/voltage measurements. The results are summarized in Table 1 below.

[Fluctuated-load Durability] (Accelerated Deterioration Test on Catalytic Metal)

After measuring the initial voltages of the single cells that used the catalysts according to Experimental Example Nos. 1-20, a durability test were performed under conditions being specified below.

Said single cells were heated to a temperature of 80° C., and then the current value was fluctuated between OCV and 0.1 $A/cm^2$ for every 5 seconds for a total time period of 3,000 hours while supplying humidified air, which was passed through a bubbler being heated to 60° C., to the cathode-side electrodes in a stoichiometric ratio of 3.5; and supplying humidified hydrogen, which was passed through a bubbler being heated to 60° C., to the anode-side electrodes in a stoichiometric ratio of 3.

The durabilities were compared by the voltage values at 0.9 $A/cm^2$ current density after performing the current/voltage measurement. The results are summarized in Table 1 below.

After measuring the initial voltages of the single cells that used the catalysts according to Experimental Example Nos. 21-24, a durability test were performed under conditions being specified below.

Said single cells were heated to a temperature of 80° C., and then the current value was fluctuated between OCV and 0.1 $A/cm^2$ for every 5 seconds for a total time period of 4,000 hours while supplying humidified air, which was passed through a bubbler being heated to 60° C., to the cathode-side electrodes in a stoichiometric ratio of 3.5; and supplying humidified hydrogen, which was passed through a bubbler being heated to 60 DC, to the anode-side electrodes in a stoichiometric ratio of 3.

The durabilities were compared by the voltage values at 0.9 $A/cm^2$ current density after performing the current/voltage measurement. The results are summarized in Table 2 below.

[High-potential Endurance Test] (Accelerated Oxidation Test on Support)

After measuring the initial voltages of the single cells that used the catalysts according to Experimental Example Nos. 1-20, an endurance test was performed under conditions being specified below.

Said single cells were heated to a temperature of 80° C., and were then held in such a state that 1.5 V voltage was applied to them by means of an external power source for 10 minutes while supplying humidified air, which was passed through a bubbler being heated to 60° C., to the cathode-side electrodes in a stoichiometric ratio of 3.5; and supplying humidified hydrogen, which was passed through a bubbler being heated to 60 DC, to the anode-side electrodes in a stoichiometric ratio of 3; thereafter the current/voltage measurement was performed; and thereafter they were compared by the voltage values at 0.9 A/cm$^2$ current dens it y. The results are summarized in Table 1 below.

Moreover, after measuring the initial voltages of the single cells that used the catalysts according to Experimental Example Nos. 25-28, an endurance test was performed under conditions being specified below.

Said single cells were heated to a temperature of 80° C., and were then held in such a state that 1.5 V voltage was applied to them by means of an external power source for 30 minutes while supplying humidified air, which was passed through a bubbler being heated to 60° C., to the cathode-side electrodes in a stoichiometric ratio of 3.5; and supplying humidified hydrogen, which was passed through a bubbler being heated to 60° C., to the anode-side electrodes in a stoichiometric ratio of 3; thereafter the current/voltage measurement was performed; and thereafter they were compared by the voltage values at 0.9 A/cm$^2$ current density. The results are summarized in Table 3 below.

First of all, a conventional binary system alloy catalyst was compared with the ternary system catalysts that were obtained by the production process according to the invention of the present application.

In FIG. 1, there are illustrated a current/voltage characteristic of the single cell that was prepared employing the catalyst according to Experimental Example No. 1, and that of the single cell that was prepared utilizing the catalyst according to Experimental Example No. 10. From FIG. 1, it is understood that, in the catalyst according to Experimental Example No. 1 that was produced by the production method according to the present invention, a higher battery voltage was retained than those in the catalyst according to Experimental Example No. 10, one of the conventional binary system alloy catalysts, even in a higher current-density region, and thereby it was made high-performance. This is believed to be the performance degradation that resulted from the fact that, in the conventional binary system alloy catalyst, the oxygen supply became insufficient because of the occurrence of the flooding phenomenon being caused by the generated water in a higher current-density region.

Figure 2:
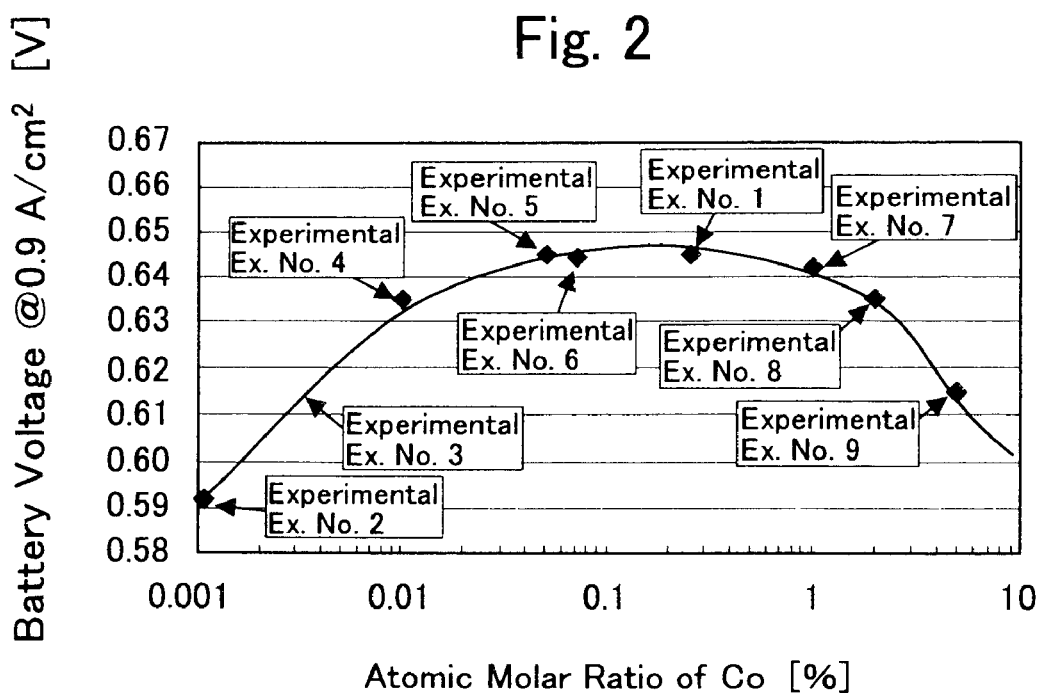
FIG. 2 is a curve-chart diagram for illustrating a relationship of atomic molar ratios of cobalt versus cell voltages.

Moreover, in FIG. 2, relationships between the cell voltages and the atomic molar ratios of cobalt are illustrated, and thereby the dependency of the cell voltages to the atomic molar ratios of cobalt was examined. According to FIG. 2, it was revealed that, when the atomic molar ratio of cobalt is 0.01-2 with respect to the atomic molar ratio of platinum, a battery voltage that is higher than that in conventional binary system alloy catalyst is obtainable.

Figure 3:
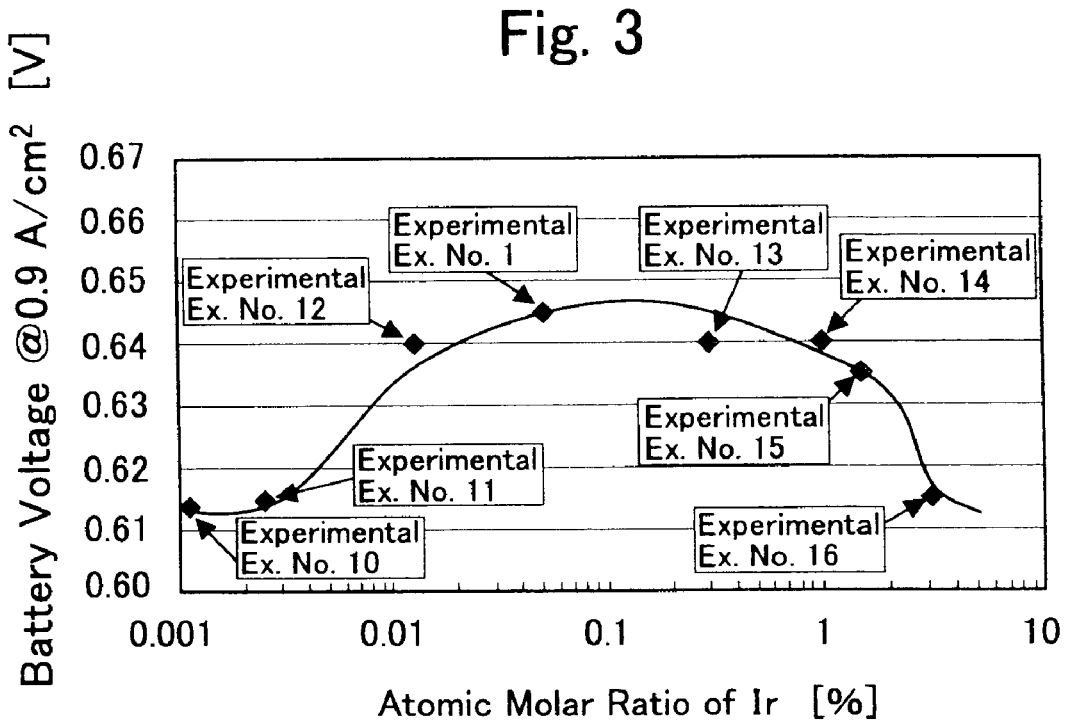
FIG. 3 is a curve-chart diagram for illustrating a relationship of atomic molar ratios of iridium versus cell voltages.

In addition, in FIG. 3, relationships between the cell voltages and the atomic molar ratios of iridium are illustrated, and thereby the dependency of the cell voltages to the atomic molar ratios of iridium was examined. According to FIG. 3, it was revealed that, when the atomic molar ratio of iridium is 0.01-2 with respect to the atomic molar ratio of platinum, a battery voltage that is higher than that in conventional binary system alloy catalyst is obtainable.

Next, the fluctuated-load durabilities will be explained.

Figure 4:
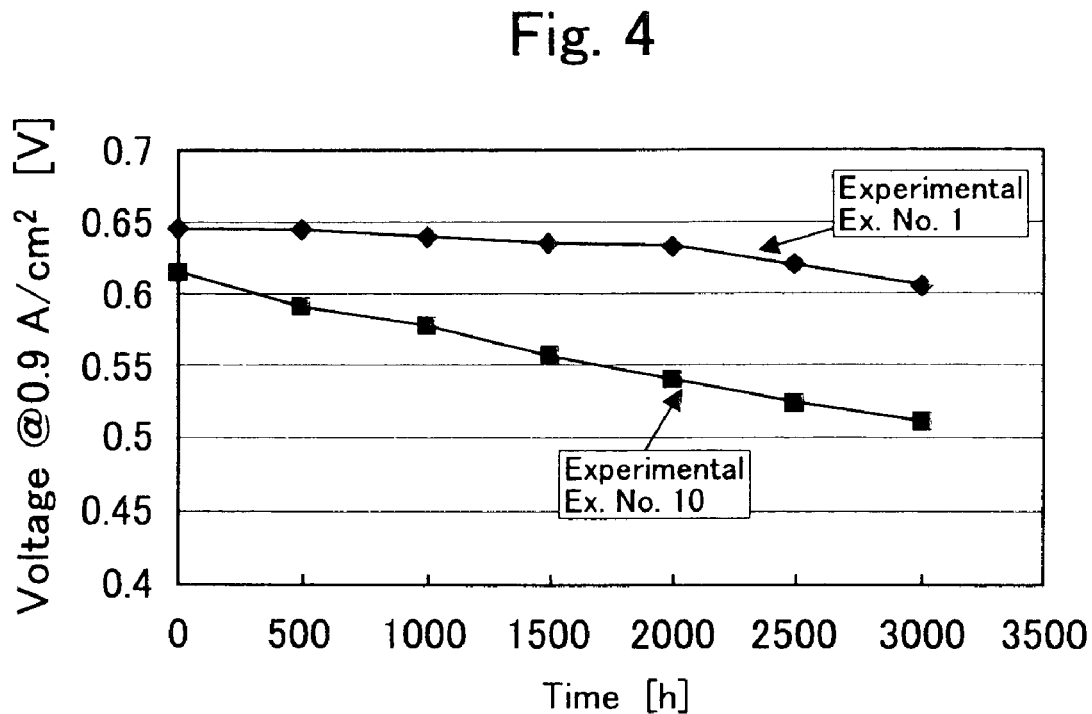
FIG. 4 is a curve-chart diagram for illustrating a relationship between load-fluctuated endurance testing times and voltages of a single cell that was made employing a catalyst of Experimental Example No. 1, and a relationship between load-fluctuated endurance testing times and voltages of a single cell that was made utilizing a catalyst of Experimental Example No. 10.

In FIG. 4, there are illustrated a relationship between the testing times of fluctuated-load endurance test with varied testing times and the voltages regarding the single cell that was prepared employing the catalyst according to Experimental Example No. 1, and those regarding the single cell that was prepared utilizing the catalyst according to Experimental Example No. 10. It is understood that the catalyst that was obtained by the production process according to Experimental Example No. 1 was superior to the catalyst that was obtained by the production process according to Experimental Example No. 10, one of the conventional binary system alloy catalysts, in terms of durability.

Figure 5:
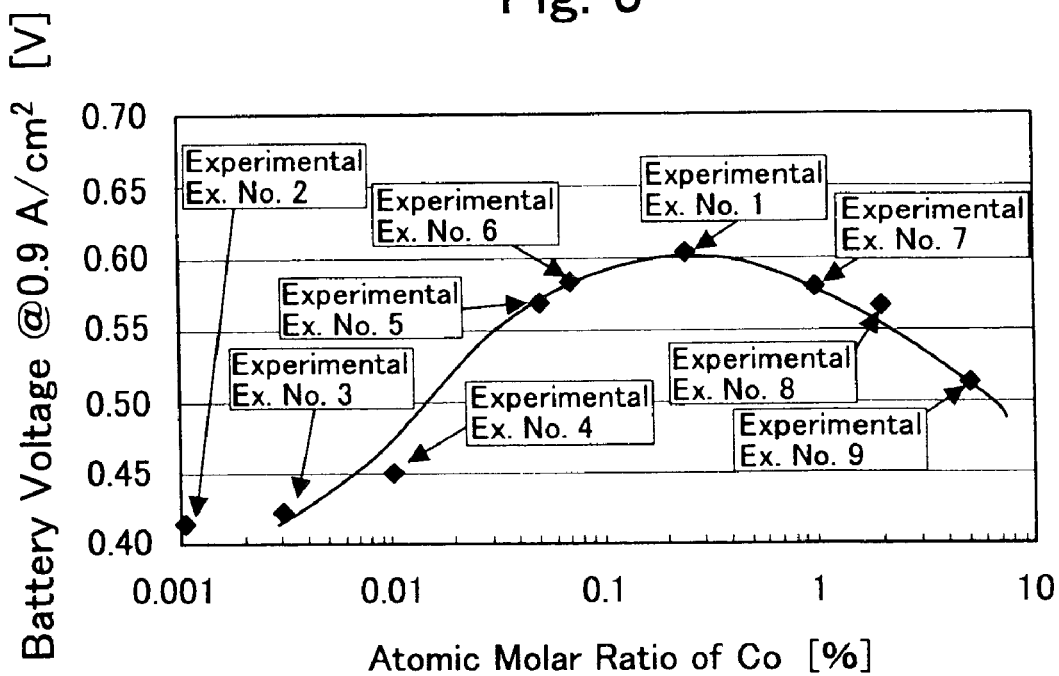
FIG. 5 is a curve-chart diagram for illustrating a relationship on a dependency of battery voltages on atomic molar ratios of cobalt.

A graph that summarizes the dependency of the single-cell voltage after the voltage-loaded endurance test to the atomic molar ratio of cobalt is illustrated in FIG. 5. In the catalysts shown in FIG. 5, the compositional ratios of Pt and Ir were constant. It was found out that, from this result as well, the catalysts that were obtained by the production processes according to Experimental Example Nos. 1 and 3-9 were superior to Experimental Example No. 2 in terms of durability. Moreover, it was found out that the catalysts that were alloyed in such a range that the molar ratio of Co was 0.07-1.0 had a high durability.

Figure 6:
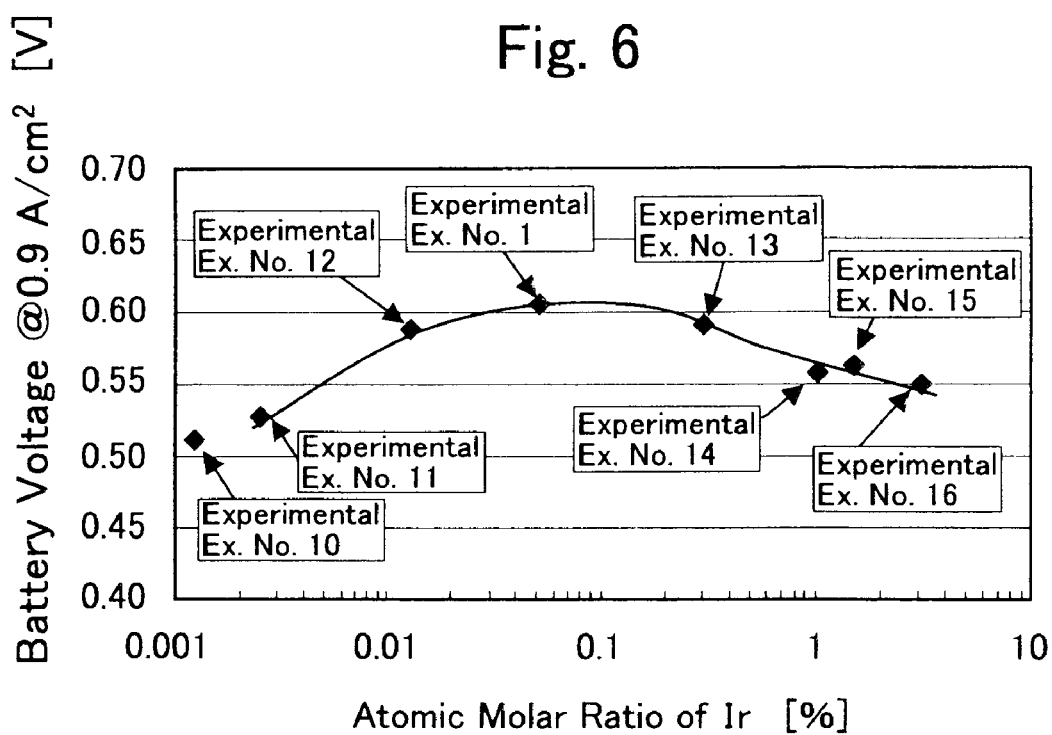
FIG. 6 is a curve-chart diagram for illustrating a relationship on a dependency of battery voltages after load-fluctuated endurance test on atomic molar ratios of iridium.

A graph that summarizes the dependency of the battery voltage after the load-fluctuated endurance test to the atomic molar ratio of iridium is illustrated in FIG. 6. In the catalysts shown in FIG. 6, the compositional ratios of Pt and Co were constant. It was found that the catalysts according to Experimental Example No. 1 and Experimental Example Nos. 11-16 were superior to Experimental Example No. 10 in terms of durability. It was understood that the catalysts that were alloyed in such a range that the atomic molar ratio of iridium was 0.01-0.3 had a high durability.

Figure 7:
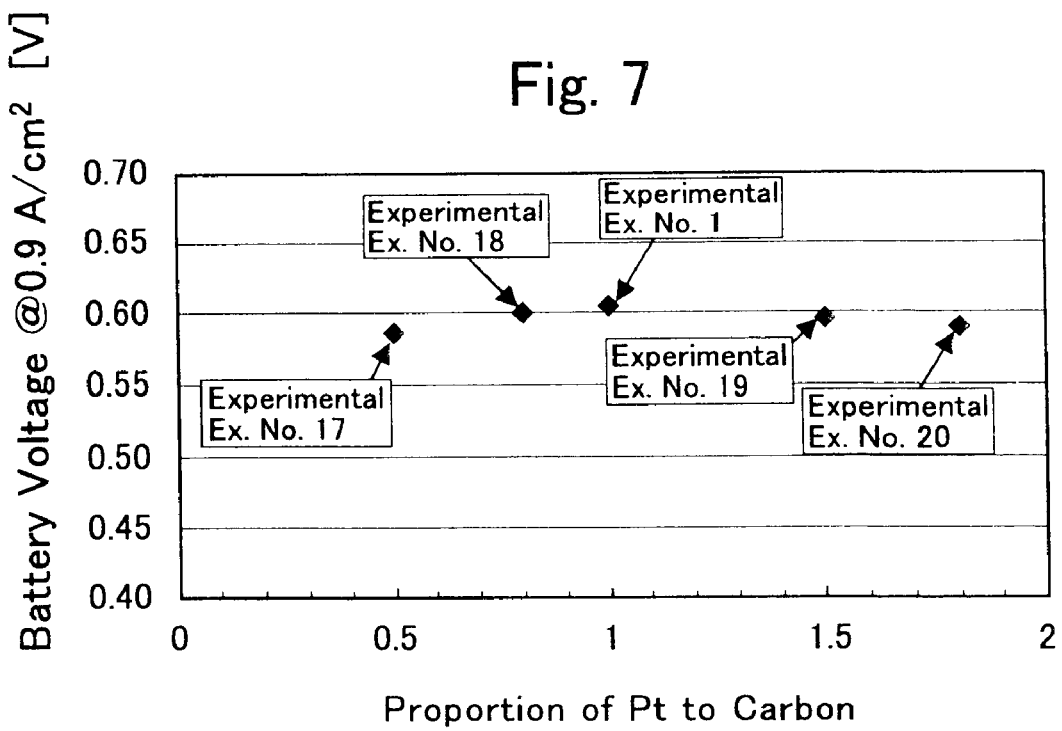
FIG. 7 is a diagram for illustrating relationships on a dependency of battery voltages after load-fluctuated endurance test on proportions of platinum to carbon.

In FIG. 7 I there is illustrated the dependency of the battery voltage after the load-fluctuated endurance test to the proportion of platinum to carbon. According to FIG. 7, it is desirable that the loading amount of platinum can preferably be 0.6-1.7 by mass proportion of Pt/C.

Figure 8:
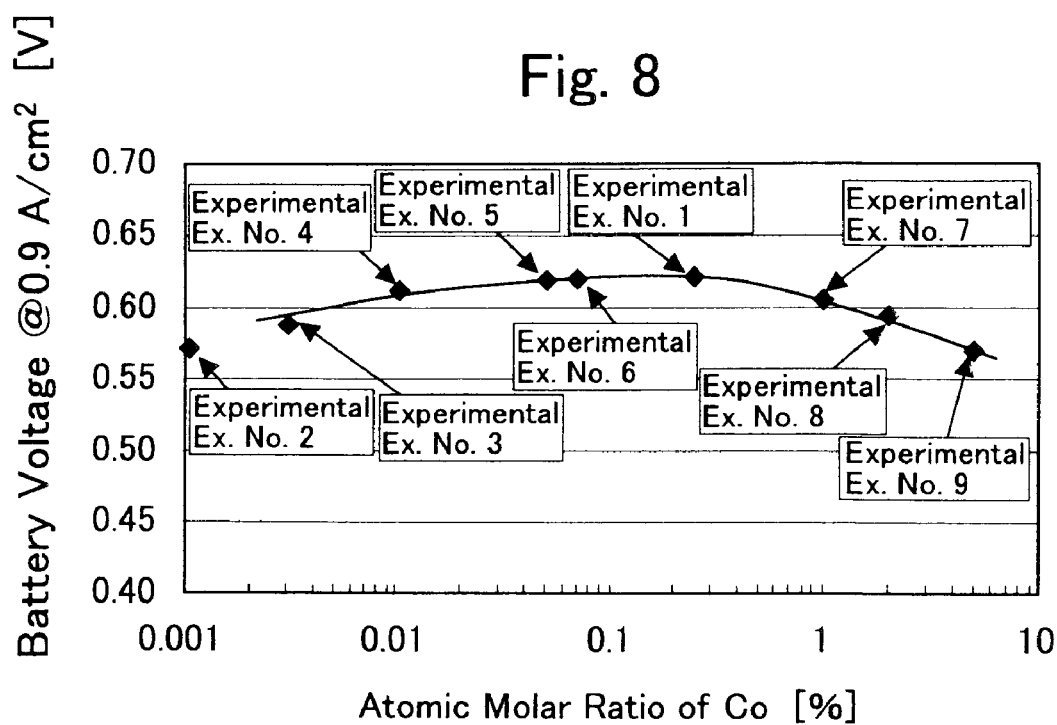
FIG. 8 is a curve-chart diagram for illustrating a relationship on a dependency of battery voltages after high-potential endurance test on atomic molar ratios of cobalt.

A graph that summarizes, from the aforementioned results, the dependency of the battery voltage after the high-potential endurance test to the atomic molar ratio of cobalt is illustrated in FIG. 8. In the catalysts shown in FIG. 8, the compositional ratios of Pt and Ir were constant. It was found out that the catalysts that were produced by the production processes according to Experimental Example No. 1 and Experimental Example Nos. 3-9 were superior to the conventional binary system (Experimental Example No. 2) in terms of durability. Moreover, it was found out that the catalysts that were alloyed in such a range that the atomic molar ratio of Co was 2 or less had a high durability.

Figure 9:
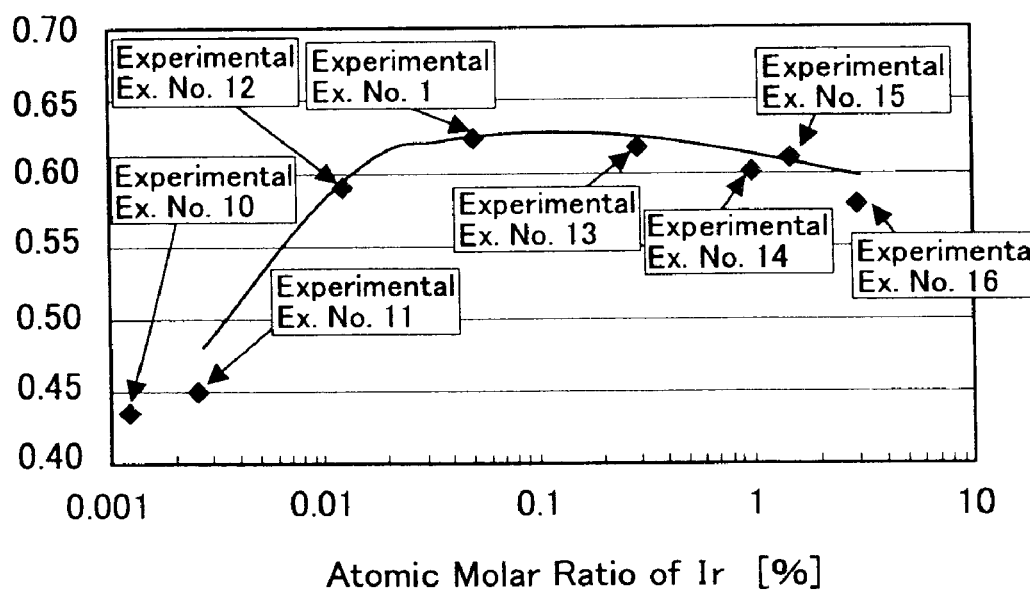
FIG. 9 is a curve-chart diagram for illustrating a relationship on a dependency of battery voltages after high-potential endurance test on atomic molar ratios of iridium.

A graph that summarizes the dependency of the battery voltage after the high-potential endurance test to the atomic molar ratio of iridium is illustrated in FIG. 9. In the catalysts shown in FIG. 9, the compositional ratios of Pt and Co were constant.

In the same manner as aforementioned, it was found out that the catalysts that were obtained by the production processes according to Experimental Example No. 1 and Experimental Example Nos. 11-16 were superior to the conventional binary system (Experimental Example No. 10) in terms of durability. Moreover, it was found out that the catalysts that were alloyed in such a range that the Ir molar ratio was 0.01 or more had a high durability.

Figure 10:
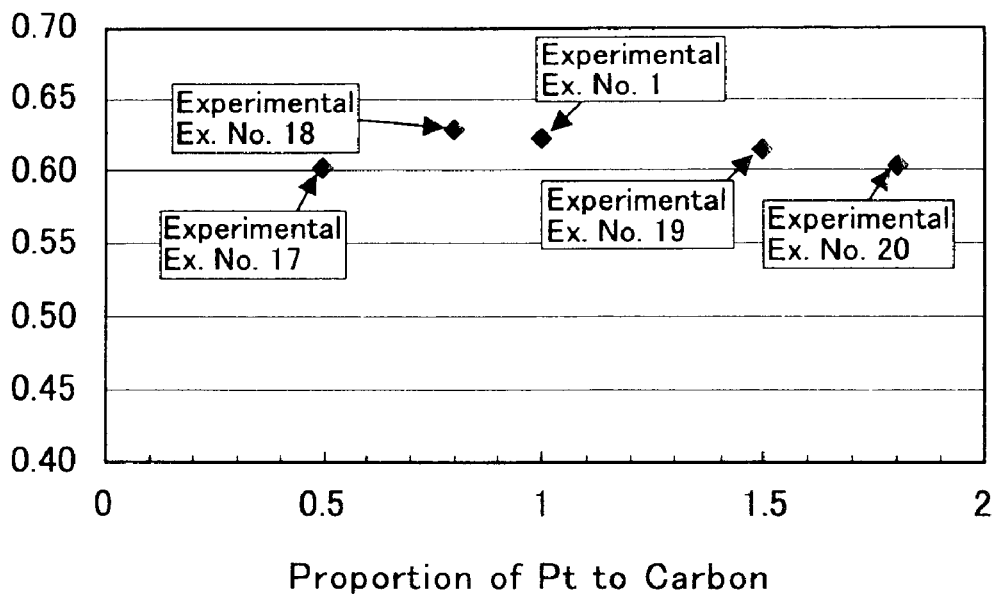
FIG. 10 is a diagram for illustrating relationships on dependency of battery voltages after high-potential endurance test on proportions of platinum to carbon.

In FIG. 10, there is illustrated the dependency of the battery voltage after the high-potential endurance test to the proportion of platinum to carbon. According to FIG. 10, it is desirable that the loading amount of platinum can preferably be 0.6-1.7 by mass proportion of Pt/C.

Next, the differences between the performance of catalysts, differences which resulted from the varied alloying conditions, will be compared.

Figure 11:
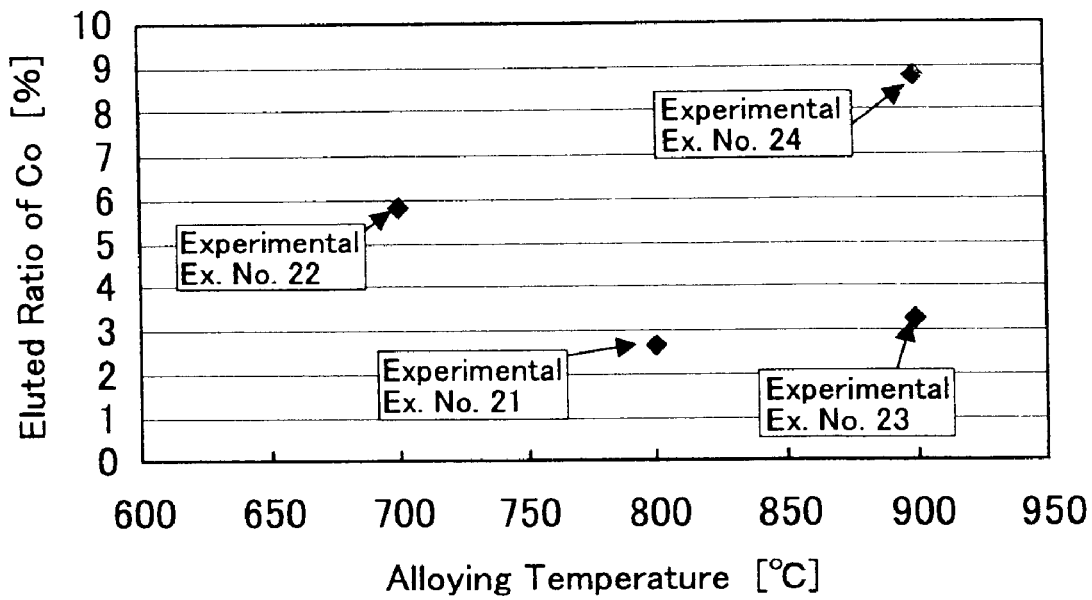
FIG. 11 is a diagram for illustrating relationships between alloying temperatures of Experimental Example Nos. 21-24 and eluted Co ratios thereof.

In FIG. 11, there is illustrated a graph that compares the alloying temperatures in Experimental Example Nos. 21-24 with the eluted Co ratios therein. As shown in FIG. 11, it was understood that, compared with Experimental Example No. 24 in which the reducing treatment was carried out in hydrogen and which was thereafter alloyed in a nitrogen gas, the eluted Co ratios declined in all of Experimental Example Nos. 21-23 which were alloyed in Ar so that their acid resistances improved.

Figure 12:
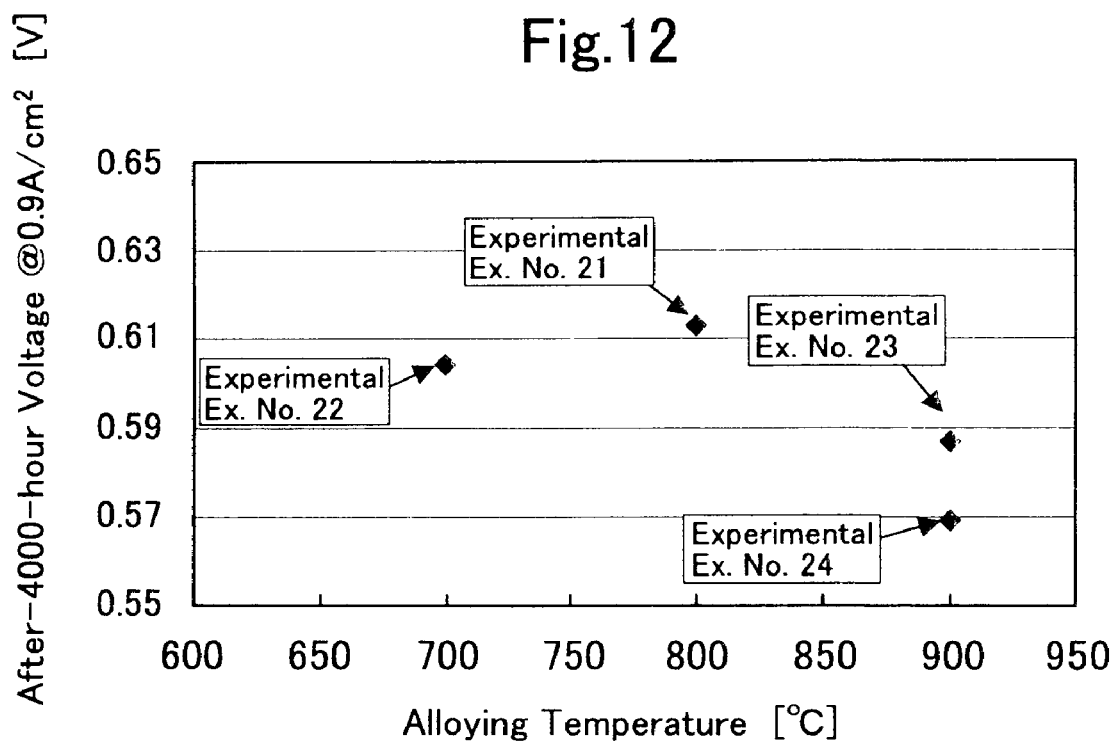
FIG. 12 is a diagram for illustrating relationships between alloying temperatures of Experimental Example Nos. 21-24 and voltage values thereof @0.9 A/cm$^2$ after 4,000-hour load-fluctuated endurance test.

In FIG. 12, there is illustrated a graph that compares the alloying temperatures in Experimental Example Nos. 21-24 with the voltage values @0.9 A/cm$^2$ after the 4,000-hour load-fluctuated endurance test therein. As shown in FIG. 12, it was understood that, compared with Experimental Example No. 24 in which the reducing treatment was carried out in hydrogen and which was thereafter alloyed in a nitrogen gas, all of Experimental Example Nos. 21-23 which were alloyed in Ar exhibited high voltages so that they had high durabilities.

Figure 13:
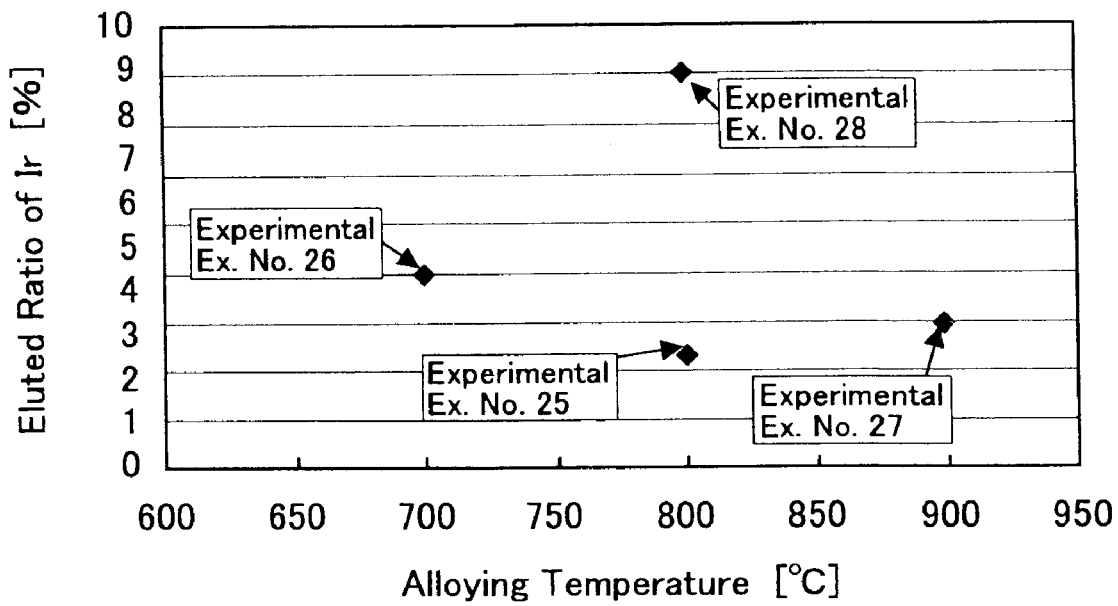
FIG. 13 is a diagram for illustrating relationships between alloying temperatures of Experimental Example Nos. 25-28 and eluted Ir ratios thereof.

Moreover, in FIG. 13, there is likewise illustrated a graph that compares the alloying temperatures in Experimental Example Nos. 25-28 with the eluted Ir ratios therein. As shown in FIG. 13, it was understood that, compared with Experimental Example No. 28 in which no treatment was carried out with a reducing acid prior to the acid treatment, the eluted Ir ratios decreased in all of Experimental Example Nos. 25-27 in which a treatment was carried out with a reducing acid prior to the acid treatment so that their acid resistances improved.

Figure 14:
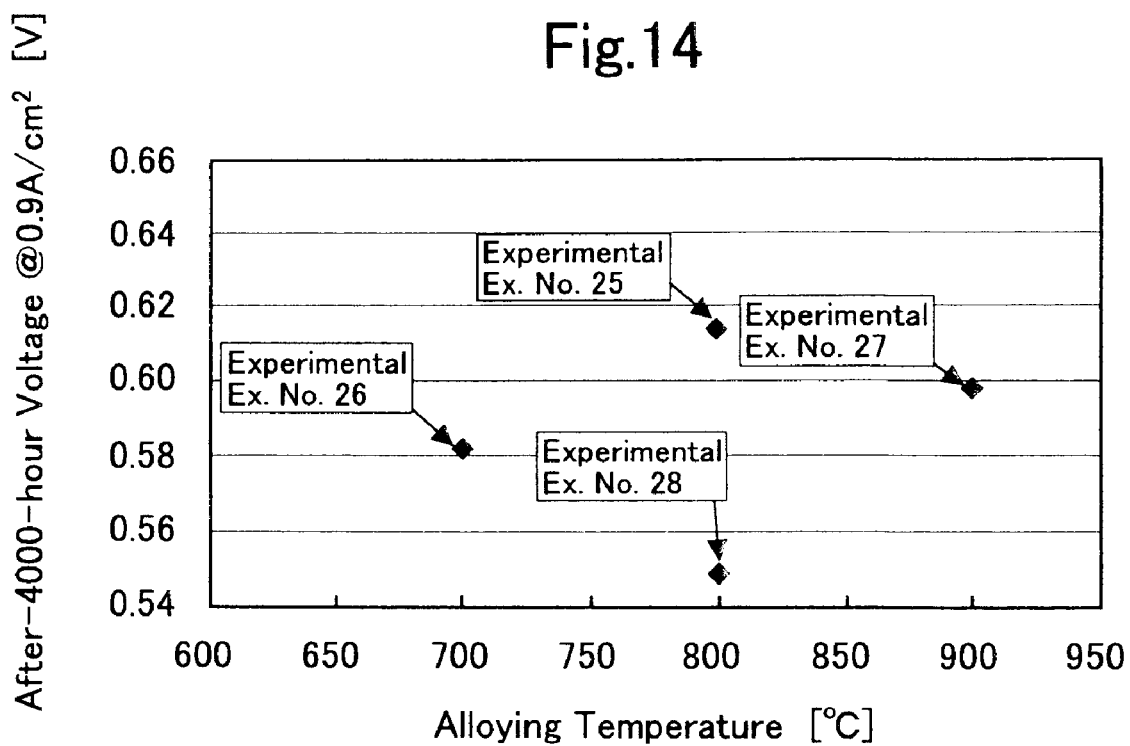
FIG. 14 is a diagram for illustrating relationships between alloying temperatures of Experimental Example Nos. 25-28 and voltage values thereof @0.9 A/cm$^2$ after 4,000-hour load-fluctuated endurance test.

In FIG. 14, there is illustrated relationships between the alloying temperatures in the single cells, which used the catalysts according to Experimental Example Nos. 25-28, and their voltage values @0.9 Ncm$^2$ after the 4,000-hour load-fluctuated endurance test. As shown in FIG. 14, it was understood that, compared with Experimental Example No. 28 in which no treatment was carried out with a reducing acid prior to the acid treatment, all of Experimental Example Nos. 25-27 in which a treatment was carried out with a reducing acid prior to the acid treatment exhibited high voltages so that they had high durabilities.

Moreover, in FIG. 15, there is illustrated relationships between the eluted Ir ratios in the single cells, which used the catalysts according to Experimental Example Nos. 25-28, and their voltage values @0.9 A/cm$^2$ after the 4,000-hour load-fluctuated endurance test. As can be seen in FIG. 15, it is assumed that the durability resulting from Ir could be maintained because of the fact that the eluted amount of Ir decreased, and thereby they came to have higher high-potential durabilities. It was understood that, among them, Experimental Example No. 25 in which the alloying was carried out at 800 t had a much higher durability.

[Viscosity Dependency]

In the verification of this time, although the durability improved regardless of the particle diameters of Pt, it is preferable that, taking the suppression of the elution of Pt into consideration, the particle diameters can be 3 nm or more, and it is preferable that the adsorption amount of Co can be 19-35 mL/g-Pt. It is preferable that, taking the decrease of active sites resulting from the decline of specific surface area into consideration, the particle diameters of Pt can 6 nm or less.

TABLE 1

| | Pt:C Molar Proportion (%) | | Atomic Molar Ratio (%) | | | Average Particle Diameter | Co Adsorption Amount | Initial Battery Voltage @0.9 A/cm$^2$ | Battery Voltage @0.9 A/cm$^2$ after 3000-hour Load-fluctuated Endurance Test | Battery Voltage @0.9 A/cm$^2$ after High-potential Endurance Test |
|---|---|---|---|---|---|---|---|---|---|---|
| | Pt | C | Pt | Co | Ir | [nm] | [mL/g-Pt] | [V] | [V] | [V] |
| Experimental Ex. No. 1 | 1 | 1 | 1 | 0.25 | 0.05 | 5.2 | 27 | 0.645 | 0.605 | 0.623 |
| Experimental Ex. No. 2 | 1 | 1 | 1 | 0 | 0.05 | 4.5 | 24 | 0.59 | 0.413 | 0.572 |
| Experimental Ex. No. 3 | 1 | 1 | 1 | 0.003 | 0.05 | 5.0 | 27 | 0.615 | 0.423 | 0.588 |
| Experimental Ex. No. 4 | 1 | 1 | 1 | 0.01 | 0.05 | 4.9 | 27 | 0.635 | 0.45 | 0.613 |
| Experimental Ex. No. 5 | 1 | 1 | 1 | 0.05 | 0.05 | 4.8 | 29 | 0.645 | 0.570 | 0.620 |
| Experimental Ex. No. 6 | 1 | 1 | 1 | 0.07 | 0.05 | 4.8 | 29 | 0.644 | 0.585 | 0.621 |
| Experimental Ex. No. 7 | 1 | 1 | 1 | 1 | 0.05 | 4.2 | 30 | 0.642 | 0.582 | 0.607 |
| Experimental Ex. No. 8 | 1 | 1 | 1 | 2 | 0.05 | 4.2 | 30 | 0.635 | 0.568 | 0.595 |
| Experimental Ex. No. 9 | 1 | 1 | 1 | 5 | 0.05 | 3.8 | 32 | 0.615 | 0.514 | 0.569 |
| Experimental Ex. No. 10 | 1 | 1 | 1 | 0.25 | 0 | 4.7 | 23 | 0.615 | 0.511 | 0.448 |
| Experimental Ex. No. 11 | 1 | 1 | 1 | 0.25 | 0.0025 | 5.1 | 24 | 0.615 | 0.527 | 0.45 |
| Experimental Ex. No. 12 | 1 | 1 | 1 | 0.25 | 0.0125 | 4.5 | 27 | 0.64 | 0.588 | 0.591 |
| Experimental Ex. No. 13 | 1 | 1 | 1 | 0.25 | 0.3 | 5.1 | 29 | 0.64 | 0.59 | 0.618 |

TABLE 1-continued

| | Pt:C Molar Proportion (%) | | Atomic Molar Ratio (%) | | | Average Particle Diameter | Co Adsorption Amount | Initial Battery Voltage @0.9 A/cm$^2$ | Battery Voltage @0.9 A/cm$^2$ after 3000-hour Load-fluctuated Endurance Test | Battery Voltage @0.9 A/cm$^2$ after High-potential Endurance Test |
|---|---|---|---|---|---|---|---|---|---|---|
| | Pt | C | Pt | Co | Ir | [nm] | [mL/g-Pt] | [V] | [V] | [V] |
| Experimental Ex. No. 14 | 1 | 1 | 1 | 0.25 | 1 | 4.5 | 28 | 0.64 | 0.557 | 0.603 |
| Experimental Ex. No. 15 | 1 | 1 | 1 | 0.25 | 1.5 | 5.1 | 29 | 0.64 | 0.571 | 0.612 |
| Experimental Ex. No. 16 | 1 | 1 | 1 | 0.25 | 3 | 4.5 | 28 | 0.615 | 0.550 | 0.580 |
| Experimental Ex. No. 17 | 0.5 | 1 | 1 | 0.25 | 0.05 | 3.0 | 35 | 0.642 | 0.586 | 0.603 |
| Experimental Ex. No. 18 | 0.8 | 1 | 1 | 0.25 | 0.05 | 4.9 | 30 | 0.650 | 0.6 | 0.629 |
| Experimental Ex. No. 19 | 1.5 | 1 | 1 | 0.25 | 0.05 | 5.5 | 23 | 0.640 | 0.597 | 0.617 |
| Experimental Ex. No. 20 | 1.8 | 1 | 1 | 0.25 | 0.05 | 6.0 | 19 | 0.636 | 0.589 | 0.606 |

TABLE 2

| | Pt:C Molar Proportion (%) | | Atomic Molar Ratio (%) | | | Alloying Temperature (° C.) | Average Particle Diameter [nm] | Co Adsorption Amount [mL/g-Pt] | Co Elution Ratio (%) | Battery Voltage @0.9 A/cm$^2$ after 4000-hour Load-fluctuated Endurance Test [V] |
|---|---|---|---|---|---|---|---|---|---|---|
| | Pt | C | Pt | Co | Ir | | | | | |
| Experimental Ex. No. 21 | 1 | 1 | 1 | 0.25 | 0.05 | 800 | 4.4 | 29 | 2.7 | 0.613 |
| Experimental Ex. No. 22 | 1 | 1 | 1 | 0.25 | 0.05 | 700 | 4.0 | 31 | 5.8 | 0.604 |
| Experimental Ex. No. 23 | 1 | 1 | 1 | 0.25 | 0.05 | 900 | 4.9 | 27 | 3.3 | 0.587 |
| Experimental Ex. No. 24 | 1 | 1 | 1 | 0.25 | 0.05 | 900 | 5.2 | 27 | 8.8 | 0.569 |

TABLE 3

| | Pt:C Molar Proportion (%) | | Atomic Molar Ratio (%) | | | Alloying Temperature (° C.) | Reducing Treatment | Acid Treatment | Average Particle Diameter [nm] | Co Adsorption Amount [mL/g-Pt] | Ir Elution Rate (%) | Battery Voltage @0.9 A/cm$^2$ after High-potential Endurance Test [V] |
|---|---|---|---|---|---|---|---|---|---|---|---|---|
| | Pt | C | Pt | Co | Ir | | | | | | | |
| Experimental Ex. No. 25 | 1 | 1 | 1 | 0.25 | 0.05 | 800 | Formic Acid | Nitric Acid | 4.3 | 29 | 4.6 | 0.614 |
| Experimental Ex. No. 26 | 1 | 1 | 1 | 0.25 | 0.05 | 700 | Formic Acid | Nitric Acid | 4.0 | 30 | 8.0 | 0.582 |
| Experimental Ex. No. 27 | 1 | 1 | 1 | 0.25 | 0.05 | 900 | Formic Acid | Nitric Acid | 4.6 | 27 | 5.5 | 0.598 |
| Experimental Ex. No. 28 | 1 | 1 | 1 | 0.25 | 0.05 | 800 | None | Nitric Acid | 4.4 | 29 | 16.0 | 0.549 |

INDUSTRIAL APPLICABILITY

By means of using the ternary system catalyst including platinum, a base-metal element and iridium, ternary system catalyst which is obtained by the production process of the invention according to the present application, for fuel cell, it is possible to make the initial voltage high, and to make endurance characteristics, especially, to make the voltage drop being caused by high-potential application less. Moreover, turning it into batteries with high durability makes it possible to make fuel cells high-performance, and makes the downsizing of apparatus possible, downsizing which results from making them high-performance, thereby contributing to popularizing fuel cells.

The invention claimed is:

1. A production process of an electrode catalyst for fuel cell, the electrode catalyst on which ternary system catalytic particles are loaded, the production process comprising:
   dispersing a conductive support in a solution, thereby preparing a dispersion liquid;

dropping a platinum-salt solution, a base-metal-salt solution and an iridium-salt solution into the dispersion liquid, thereby loading respective metallic salts on the conductive support as metallic hydroxides under an alkaline condition; and alloying comprising heating the conductive support and the metallic hydroxides of platinum, base metal, and iridium loaded thereon in a reducing atmosphere and treating the conductive support with the metallic hydroxides loaded thereon at a temperature of 700-900° C. in an inert atmosphere comprising an argon atmosphere.

2. The production process of an electrode catalyst for fuel cell set forth in claim 1 further comprising, between said loading and said alloying, filtering, washing and drying said conductive support with the metallic hydroxides loaded.

3. The production process of an electrode catalyst for fuel cell set forth in claim 1, wherein said conductive support comprises carbon; and a base metal of said base-metal-salt solution comprises one or more members of base metals being selected from the group consisting of titanium, zirconium, vanadium, chromium, manganese, iron, cobalt, nickel, copper and zinc.

4. The production process of an electrode catalyst for fuel cell set forth in claim 3, wherein a base metal of said base-metal-salt solution comprises cobalt.

5. The production process of an electrode catalyst for fuel cell set forth in claim 1, wherein a compositional ratio between the platinum element in said platinum-salt solution, the base-metal element in said base-metal-salt solution and the iridium element in said iridium-salt solution is platinum:base-metal element:iridium=1:0.01-2:0.01-2 by molar ratio.

6. The production process of an electrode catalyst for fuel cell set forth in claim 5, wherein the compositional ratio between the platinum element in said platinum-salt solution, the base-metal element in said base-metal-salt solution and the iridium element in said iridium-salt solution is platinum:base-metal element:iridium=1:0.07-1:0.01-0.3 by molar ratio.

7. The production process of an electrode catalyst for fuel cell set forth in claim 1, wherein said reducing atmosphere comprises hydrogen gas.

8. A production process of an electrode catalyst for fuel cell, the electrode catalyst on which ternary system catalytic particles are loaded, the production process comprising:
dispersing a conductive support in a solution, thereby preparing a dispersion liquid;
of dropping a platinum-salt solution, a base-metal-salt solution and an iridium-salt solution to the dispersion liquid, thereby loading respective metallic salts on the conductive support as metallic hydroxides under an alkaline condition; and
alloying comprising heating the conductive support and the metallic hydroxides loaded thereon in a reducing atmosphere and treating the conductive support with the metallic hydroxides loaded thereon at a temperature of 700-900° C. in an inert atmosphere comprising an argon atmosphere,
wherein said conductive support comprises carbon; and a proportion of a loading amount of platinum in said ternary system catalytic particles being loaded on the carbon with respect to an amount of the carbon is 0.6-1.7 by mass ratio.

9. A production process of an electrode catalyst for fuel cell, the electrode catalyst on which ternary system catalytic particles are loaded, the production process comprising:
dispersing a conductive support in a solution, thereby preparing a dispersion liquid;
dropping a platinum-salt solution, a base-metal-salt solution and an iridium-salt solution to the dispersion liquid, thereby loading respective metallic salts on the conductive support as metallic hydroxides under an alkaline condition; and
alloying comprising heating the conductive support and the metallic hydroxides loaded thereon in a reducing atmosphere and treating the conductive support with the metallic hydroxides loaded thereon at a temperature of 700-900° C. in an inert atmosphere comprising an argon atmosphere,
wherein said ternary system catalytic particles being obtained at said alloying have particle diameters falling in a range of 3-6 nm.

10. A production process of an electrode catalyst for fuel cell, the electrode catalyst on which ternary system catalytic particles are loaded, the production process comprising:
dispersing a conductive support in a solution, thereby preparing a dispersion liquid;
dropping a platinum-salt solution, a base-metal-salt solution and an iridium-salt solution to the dispersion liquid, thereby loading respective metallic salts on the conductive support as metallic hydroxides under an alkaline condition;
alloying comprising heating the conductive support and the metallic hydroxides loaded thereon in a reducing atmosphere; and
a surface treatment comprising treating the conductive support with metallic catalysts loaded that has been obtained at the alloying with a reducing acid, and thereafter treating it with an oxidizing acid.

11. The production process of an electrode catalyst for fuel cell set forth in claim 10, wherein said reducing acid comprises at least one member selected from the group consisting of formic acid and oxalic acid; and said oxidizing acid comprises at least one member selected from the group consisting of hydrochloric acid, nitric acid and sulfuric acid.

12. The production process of an electrode catalyst for fuel cell set forth in claim 11, wherein said reducing acid comprise formic acid; and said oxidizing acid comprises nitric acid.

13. The production process of an electrode catalyst for fuel cell set forth in claim 10, wherein said alloying includes treating the conductive support with the metallic hydroxides loaded thereon at a temperature of 700-900° C. in an inert atmosphere.

14. The production process of an electrode catalyst for fuel cell set forth in claim 13, wherein said inert atmosphere comprises at least one member selected from the group consisting of a nitrogen atmosphere, an argon atmosphere and a helium atmosphere.

15. The production process of an electrode catalyst for fuel cell set forth in claim 14, wherein said inert atmosphere comprises an argon atmosphere.

* * * * *

UNITED STATES PATENT AND TRADEMARK OFFICE
CERTIFICATE OF CORRECTION

| | |
|---|---|
| PATENT NO. | : 7,910,512 B2 |
| APPLICATION NO. | : 12/239234 |
| DATED | : March 22, 2011 |
| INVENTOR(S) | : Hiroaki Takahashi et al. |

It is certified that error appears in the above-identified patent and that said Letters Patent is hereby corrected as shown below:

In the specification, Table 1 should be replaced with new Table 1 as represented below:

[TABLE 1]

| | Pt:C Mass Proportion | | Atomic Molar Ratio | | | Average Particle Diameter [nm] | Co Adsorption Amount [mL/g-Pt] | Initial Battery Voltage @0.9A/cm$^2$ [V] | Battery Voltage @0.9A/cm$^2$ after 3000-hour Load-fluctuated Endurance Test [V] | Battery Voltage @0.9A/cm$^2$ after High-potential Endurance Test [V] |
|---|---|---|---|---|---|---|---|---|---|---|
| | Pt | C | Pt | Co | Ir | | | | | |
| Experimental Ex. No. 1 | 1 | 1 | 1 | 0.25 | 0.05 | 5.2 | 27 | 0.645 | 0.605 | 0.623 |
| Experimental Ex. No. 2 | 1 | 1 | 1 | 0 | 0.05 | 4.5 | 24 | 0.59 | 0.413 | 0.572 |
| Experimental Ex. No. 3 | 1 | 1 | 1 | 0.003 | 0.05 | 5.0 | 27 | 0.615 | 0.423 | 0.588 |
| Experimental Ex. No. 4 | 1 | 1 | 1 | 0.01 | 0.05 | 4.9 | 27 | 0.635 | 0.45 | 0.613 |
| Experimental Ex. No. 5 | 1 | 1 | 1 | 0.05 | 0.05 | 4.8 | 29 | 0.645 | 0.570 | 0.620 |
| Experimental Ex. No. 6 | 1 | 1 | 1 | 0.07 | 0.05 | 4.8 | 29 | 0.644 | 0.585 | 0.621 |
| Experimental Ex. No. 7 | 1 | 1 | 1 | 1 | 0.05 | 4.2 | 30 | 0.642 | 0.582 | 0.607 |
| Experimental Ex. No. 8 | 1 | 1 | 1 | 2 | 0.05 | 4.2 | 30 | 0.635 | 0.568 | 0.595 |
| Experimental Ex. No. 9 | 1 | 1 | 1 | 5 | 0.05 | 3.8 | 32 | 0.615 | 0.514 | 0.569 |
| Experimental Ex. No. 10 | 1 | 1 | 1 | 0.25 | 0 | 4.7 | 23 | 0.615 | 0.511 | 0.448 |
| Experimental Ex. No. 11 | 1 | 1 | 1 | 0.25 | 0.0025 | 5.1 | 24 | 0.615 | 0.527 | 0.45 |
| Experimental Ex. No. 12 | 1 | 1 | 1 | 0.25 | 0.0125 | 4.5 | 27 | 0.64 | 0.588 | 0.591 |
| Experimental Ex. No. 13 | 1 | 1 | 1 | 0.25 | 0.3 | 5.1 | 29 | 0.64 | 0.59 | 0.618 |
| Experimental Ex. No. 14 | 1 | 1 | 1 | 0.25 | 1 | 4.5 | 28 | 0.64 | 0.557 | 0.603 |
| Experimental Ex. No. 15 | 1 | 1 | 1 | 0.25 | 1.5 | 5.1 | 29 | 0.64 | 0.571 | 0.612 |
| Experimental Ex. No. 16 | 1 | 1 | 1 | 0.25 | 3 | 4.5 | 28 | 0.615 | 0.550 | 0.580 |
| Experimental Ex. No. 17 | 0.5 | 1 | 1 | 0.25 | 0.05 | 3.0 | 35 | 0.642 | 0.586 | 0.603 |
| Experimental Ex. No. 18 | 0.8 | 1 | 1 | 0.25 | 0.05 | 4.9 | 30 | 0.650 | 0.6 | 0.629 |
| Experimental Ex. No. 19 | 1.5 | 1 | 1 | 0.25 | 0.05 | 5.5 | 23 | 0.640 | 0.597 | 0.617 |
| Experimental Ex. No. 20 | 1.8 | 1 | 1 | 0.25 | 0.05 | 6.0 | 19 | 0.636 | 0.589 | 0.606 |

Signed and Sealed this

Twenty-sixth Day of July, 2011

David J. Kappos
*Director of the United States Patent and Trademark Office*

CERTIFICATE OF CORRECTION (continued)
U.S. Pat. No. 7,910,512 B2

In the specification, Table 2 should be replaced with new Table 2 as represented below:

[TABLE 2]

|  | Pt:C Mass Proportion | | Atomic Molar Ratio | | | Alloying Temperature (°C) | Average Particle Diameter [nm] | Co Adsorption Amount [mL/g-Pt] | Co Elution Ratio (%) | Battery Voltage @0.9A/cm² after 4000-hour Load-fluctuated Endurance Test [V] |
|---|---|---|---|---|---|---|---|---|---|---|
|  | Pt | C | Pt | Co | Ir | | | | | |
| Experimental Ex. No. 21 | 1 | 1 | 1 | 0.25 | 0.05 | 800 | 4.4 | 29 | 2.7 | 0.613 |
| Experimental Ex. No. 22 | 1 | 1 | 1 | 0.25 | 0.05 | 700 | 4.0 | 31 | 5.8 | 0.604 |
| Experimental Ex. No. 23 | 1 | 1 | 1 | 0.25 | 0.05 | 900 | 4.9 | 27 | 3.3 | 0.587 |
| Experimental Ex. No. 24 | 1 | 1 | 1 | 0.25 | 0.05 | 900 | 5.2 | 27 | 8.8 | 0.569 |

In the specification, Table 3 should be replaced with new Table 3 as represented below:

[TABLE 3]

|  | Pt:C Mass Proportion | | Atomic Molar Ratio | | | Alloying Temperature (°C) | Reducing Treatment | Acid Treatment | Average Particle Diameter [nm] | Co Adsorption Amount [mL/g-Pt] | Ir Elution Rate (%) | Battery Voltage @0.9A/cm² after High-potential Endurance Test [V] |
|---|---|---|---|---|---|---|---|---|---|---|---|---|
|  | Pt | C | Pt | Co | Ir | | | | | | | |
| Experimental Ex. No. 25 | 1 | 1 | 1 | 0.25 | 0.05 | 800 | Formic Acid | Nitric Acid | 4.3 | 29 | 4.6 | 0.614 |
| Experimental Ex. No. 26 | 1 | 1 | 1 | 0.25 | 0.05 | 700 | Formic Acid | Nitric Acid | 4.0 | 30 | 8.0 | 0.582 |
| Experimental Ex. No. 27 | 1 | 1 | 1 | 0.25 | 0.05 | 900 | Formic Acid | Nitric Acid | 4.6 | 27 | 5.5 | 0.598 |
| Experimental Ex. No. 28 | 1 | 1 | 1 | 0.25 | 0.05 | 800 | Formic Acid | Nitric Acid | 4.4 | 29 | 16.0 | 0.549 |

In claim 1, column 15, line 10, "C." should read --C--.

In claim 8, column 15, line 47, "of dropping" should read --dropping--.

In claim 8, column 15, line 56, "C." should read --C--.

In claim 9, column 16, line 16, "C." should read --C--.

In claim 12, column 16, line 44, "comprise" should read --comprises--.

In claim 13, column 16, line 49, "C." should read --C--.

UNITED STATES PATENT AND TRADEMARK OFFICE
CERTIFICATE OF CORRECTION

PATENT NO.        : 7,910,512 B2
APPLICATION NO.   : 12/239234
DATED             : March 22, 2011
INVENTOR(S)       : Hiroaki Takahashi et al.

It is certified that error appears in the above-identified patent and that said Letters Patent is hereby corrected as shown below:

In the specification, Table 1 should be replaced with new Table 1 as represented below:

[TABLE 1]

| | Pt:C Mass Proportion | | Atomic Molar Ratio | | | Average Particle Diameter [nm] | Co Adsorption Amount [mL/g-Pt] | Initial Battery Voltage @0.9A/cm$^2$ [V] | Battery Voltage @0.9A/cm$^2$ after 3000-hour Load-fluctuated Endurance Test [V] | Battery Voltage @0.9A/cm$^2$ after High-potential Endurance Test [V] |
|---|---|---|---|---|---|---|---|---|---|---|
| | Pt | C | Pt | Co | Ir | | | | | |
| Experimental Ex. No. 1 | 1 | 1 | 1 | 0.25 | 0.05 | 5.2 | 27 | 0.645 | 0.605 | 0.623 |
| Experimental Ex. No. 2 | 1 | 1 | 1 | 0 | 0.05 | 4.5 | 24 | 0.59 | 0.413 | 0.572 |
| Experimental Ex. No. 3 | 1 | 1 | 1 | 0.003 | 0.05 | 5.0 | 27 | 0.615 | 0.423 | 0.588 |
| Experimental Ex. No. 4 | 1 | 1 | 1 | 0.01 | 0.05 | 4.9 | 27 | 0.635 | 0.45 | 0.613 |
| Experimental Ex. No. 5 | 1 | 1 | 1 | 0.05 | 0.05 | 4.8 | 29 | 0.645 | 0.570 | 0.620 |
| Experimental Ex. No. 6 | 1 | 1 | 1 | 0.07 | 0.05 | 4.8 | 29 | 0.644 | 0.585 | 0.621 |
| Experimental Ex. No. 7 | 1 | 1 | 1 | 1 | 0.05 | 4.2 | 30 | 0.642 | 0.582 | 0.607 |
| Experimental Ex. No. 8 | 1 | 1 | 1 | 2 | 0.05 | 4.2 | 30 | 0.635 | 0.568 | 0.595 |
| Experimental Ex. No. 9 | 1 | 1 | 1 | 5 | 0.05 | 3.8 | 32 | 0.615 | 0.514 | 0.569 |
| Experimental Ex. No. 10 | 1 | 1 | 1 | 0.25 | 0 | 4.7 | 23 | 0.615 | 0.511 | 0.448 |
| Experimental Ex. No. 11 | 1 | 1 | 1 | 0.25 | 0.0025 | 5.1 | 24 | 0.615 | 0.527 | 0.45 |
| Experimental Ex. No. 12 | 1 | 1 | 1 | 0.25 | 0.0125 | 4.5 | 27 | 0.64 | 0.588 | 0.591 |
| Experimental Ex. No. 13 | 1 | 1 | 1 | 0.25 | 0.3 | 5.1 | 29 | 0.64 | 0.59 | 0.618 |
| Experimental Ex. No. 14 | 1 | 1 | 1 | 0.25 | 1 | 4.5 | 28 | 0.64 | 0.557 | 0.603 |
| Experimental Ex. No. 15 | 1 | 1 | 1 | 0.25 | 1.5 | 5.1 | 29 | 0.64 | 0.571 | 0.612 |
| Experimental Ex. No. 16 | 1 | 1 | 1 | 0.25 | 3 | 4.5 | 28 | 0.615 | 0.550 | 0.580 |
| Experimental Ex. No. 17 | 0.5 | 1 | 1 | 0.25 | 0.05 | 3.0 | 35 | 0.642 | 0.586 | 0.603 |
| Experimental Ex. No. 18 | 0.8 | 1 | 1 | 0.25 | 0.05 | 4.9 | 30 | 0.650 | 0.6 | 0.629 |
| Experimental Ex. No. 19 | 1.5 | 1 | 1 | 0.25 | 0.05 | 5.5 | 23 | 0.640 | 0.597 | 0.617 |
| Experimental Ex. No. 20 | 1.8 | 1 | 1 | 0.25 | 0.05 | 6.0 | 19 | 0.636 | 0.589 | 0.606 |

This certificate supersedes the Certificate of Correction issued July 26, 2011.

Signed and Sealed this
Twentieth Day of March, 2012

David J. Kappos
*Director of the United States Patent and Trademark Office*

CERTIFICATE OF CORRECTION (continued)
U.S. Pat. No. 7,910,512 B2

In the specification, Table 2 should be replaced with new Table 2 as represented below:

[TABLE 2]

| | Pt:C Mass Proportion | | Atomic Molar Ratio | | | Alloying Temperature (°C) | Average Particle Diameter [nm] | Co Adsorption Amount [mL/g-Pt] | Co Elution Ratio (%) | Battery Voltage @0.9A/cm$^2$ after 4000-hour Load-fluctuated Endurance Test [V] |
|---|---|---|---|---|---|---|---|---|---|---|
| | Pt | C | Pt | Co | Ir | | | | | |
| Experimental Ex. No. 21 | 1 | 1 | 1 | 0.25 | 0.05 | 800 | 4.4 | 29 | 2.7 | 0.613 |
| Experimental Ex. No. 22 | 1 | 1 | 1 | 0.25 | 0.05 | 700 | 4.0 | 31 | 5.8 | 0.604 |
| Experimental Ex. No. 23 | 1 | 1 | 1 | 0.25 | 0.05 | 900 | 4.9 | 27 | 3.3 | 0.587 |
| Experimental Ex. No. 24 | 1 | 1 | 1 | 0.25 | 0.05 | 900 | 5.2 | 27 | 8.8 | 0.569 |

In the specification, Table 3 should be replaced with new Table 3 as represented below:

[TABLE 3]

| | Pt:C Mass Proportion | | Atomic Molar Ratio | | | Alloying Temperature (°C) | Reducing Treatment | Acid Treatment | Average Particle Diameter [nm] | Co Adsorption Amount [mL/g-Pt] | Ir Elution Rate (%) | Battery Voltage @0.9A/cm$^2$ after High-potential Endurance Test [V] |
|---|---|---|---|---|---|---|---|---|---|---|---|---|
| | Pt | C | Pt | Co | Ir | | | | | | | |
| Experimental Ex. No. 25 | 1 | 1 | 1 | 0.25 | 0.05 | 800 | Formic Acid | Nitric Acid | 4.3 | 29 | 4.6 | 0.614 |
| Experimental Ex. No. 26 | 1 | 1 | 1 | 0.25 | 0.05 | 700 | Formic Acid | Nitric Acid | 4.0 | 30 | 8.0 | 0.582 |
| Experimental Ex. No. 27 | 1 | 1 | 1 | 0.25 | 0.05 | 900 | Formic Acid | Nitric Acid | 4.6 | 27 | 5.5 | 0.598 |
| Experimental Ex. No. 28 | 1 | 1 | 1 | 0.25 | 0.05 | 800 | Formic Acid | Nitric Acid | 4.4 | 29 | 16.0 | 0.549 |

In claim 1, column 15, line 10, "C." should read --C--.

In claim 8, column 15, line 47, "of dropping" should read --dropping--.

In claim 8, column 15, line 56, "C." should read --C--.

In claim 9, column 16, line 16, "C." should read --C--.

In claim 12, column 16, line 44, "comprise" should read --comprises--.

In claim 13, column 16, line 49, "C." should read --C--.

UNITED STATES PATENT AND TRADEMARK OFFICE
CERTIFICATE OF CORRECTION

| | |
|---|---|
| PATENT NO. | : 7,910,512 B2 |
| APPLICATION NO. | : 12/239234 |
| DATED | : March 22, 2011 |
| INVENTOR(S) | : Hiroaki Takahashi et al. |

Page 1 of 2

It is certified that error appears in the above-identified patent and that said Letters Patent is hereby corrected as shown below:

In the specification, Table 1 should be replaced with new Table 1 as represented below:

[TABLE 1]

| | Pt:C Mass Proportion | | Atomic Molar Ratio | | | Average Particle Diameter [nm] | Co Adsorption Amount [mL/g-Pt] | Initial Battery Voltage @0.9A/cm² [V] | Battery Voltage @0.9A/cm² after 3000-hour Load-fluctuated Endurance Test [V] | Battery Voltage @0.9A/cm² after High-potential Endurance Test [V] |
|---|---|---|---|---|---|---|---|---|---|---|
| | Pt | C | Pt | Co | Ir | | | | | |
| Experimental Ex. No. 1 | 1 | 1 | 1 | 0.25 | 0.05 | 5.2 | 27 | 0.645 | 0.605 | 0.623 |
| Experimental Ex. No. 2 | 1 | 1 | 1 | 0 | 0.05 | 4.5 | 24 | 0.59 | 0.413 | 0.572 |
| Experimental Ex. No. 3 | 1 | 1 | 1 | 0.003 | 0.05 | 5.0 | 27 | 0.615 | 0.423 | 0.588 |
| Experimental Ex. No. 4 | 1 | 1 | 1 | 0.01 | 0.05 | 4.9 | 27 | 0.635 | 0.45 | 0.613 |
| Experimental Ex. No. 5 | 1 | 1 | 1 | 0.05 | 0.05 | 4.8 | 29 | 0.645 | 0.570 | 0.620 |
| Experimental Ex. No. 6 | 1 | 1 | 1 | 0.07 | 0.05 | 4.8 | 29 | 0.644 | 0.585 | 0.621 |
| Experimental Ex. No. 7 | 1 | 1 | 1 | 1 | 0.05 | 4.2 | 30 | 0.642 | 0.582 | 0.607 |
| Experimental Ex. No. 8 | 1 | 1 | 1 | 2 | 0.05 | 4.2 | 30 | 0.635 | 0.568 | 0.595 |
| Experimental Ex. No. 9 | 1 | 1 | 1 | 5 | 0.05 | 3.8 | 32 | 0.615 | 0.514 | 0.569 |
| Experimental Ex. No. 10 | 1 | 1 | 1 | 0.25 | 0 | 4.7 | 23 | 0.615 | 0.511 | 0.448 |
| Experimental Ex. No. 11 | 1 | 1 | 1 | 0.25 | 0.0025 | 5.1 | 24 | 0.615 | 0.527 | 0.45 |
| Experimental Ex. No. 12 | 1 | 1 | 1 | 0.25 | 0.0125 | 4.5 | 27 | 0.64 | 0.588 | 0.591 |
| Experimental Ex. No. 13 | 1 | 1 | 1 | 0.25 | 0.3 | 5.1 | 29 | 0.64 | 0.59 | 0.618 |
| Experimental Ex. No. 14 | 1 | 1 | 1 | 0.25 | 1 | 4.5 | 28 | 0.64 | 0.557 | 0.603 |
| Experimental Ex. No. 15 | 1 | 1 | 1 | 0.25 | 1.5 | 5.1 | 29 | 0.64 | 0.571 | 0.612 |
| Experimental Ex. No. 16 | 1 | 1 | 1 | 0.25 | 3 | 4.5 | 28 | 0.615 | 0.550 | 0.580 |
| Experimental Ex. No. 17 | 0.5 | 1 | 1 | 0.25 | 0.05 | 3.0 | 35 | 0.642 | 0.586 | 0.603 |
| Experimental Ex. No. 18 | 0.8 | 1 | 1 | 0.25 | 0.05 | 4.9 | 30 | 0.650 | 0.6 | 0.629 |
| Experimental Ex. No. 19 | 1.5 | 1 | 1 | 0.25 | 0.05 | 5.5 | 23 | 0.640 | 0.597 | 0.617 |
| Experimental Ex. No. 20 | 1.8 | 1 | 1 | 0.25 | 0.05 | 6.0 | 19 | 0.636 | 0.589 | 0.606 |

This certificate supersedes the Certificates of Correction issued July 26, 2011 and March 20, 2012.

Signed and Sealed this
Twenty-sixth Day of June, 2012

David J. Kappos
*Director of the United States Patent and Trademark Office*

CERTIFICATE OF CORRECTION (continued)

U.S. Pat. No. 7,910,512 B2

In the specification, Table 2 should be replaced with new Table 2 as represented below:

[TABLE 2]

| | Pt:C Mass Proportion | | Atomic Molar Ratio | | | Alloying Temperature (°C) | Average Particle Diameter [nm] | Co Adsorption Amount [mL/g-Pt] | Co Elution Ratio (%) | Battery Voltage @0.9A/cm² after 4000-hour Load-fluctuated Endurance Test [V] |
|---|---|---|---|---|---|---|---|---|---|---|
| | Pt | C | Pt | Co | Ir | | | | | |
| Experimental Ex. No. 21 | 1 | 1 | 1 | 0.25 | 0.05 | 800 | 4.4 | 29 | 2.7 | 0.613 |
| Experimental Ex. No. 22 | 1 | 1 | 1 | 0.25 | 0.05 | 700 | 4.0 | 31 | 5.8 | 0.604 |
| Experimental Ex. No. 23 | 1 | 1 | 1 | 0.25 | 0.05 | 900 | 4.9 | 27 | 3.3 | 0.587 |
| Experimental Ex. No. 24 | 1 | 1 | 1 | 0.25 | 0.05 | 900 | 5.2 | 27 | 8.8 | 0.569 |

In the specification, Table 3 should be replaced with new Table 3 as represented below:

[TABLE 3]

| | Pt:C Mass Proportion | | Atomic Molar Ratio | | | Alloying Temperature (°C) | Reducing Treatment | Acid Treatment | Average Particle Diameter [nm] | Co Adsorption Amount [mL/g-Pt] | Ir Elution Rate (%) | Battery Voltage @0.9A/cm² after High-potential Endurance Test [V] |
|---|---|---|---|---|---|---|---|---|---|---|---|---|
| | Pt | C | Pt | Co | Ir | | | | | | | |
| Experimental Ex. No. 25 | 1 | 1 | 1 | 0.25 | 0.05 | 800 | Formic Acid | Nitric Acid | 4.3 | 29 | 4.6 | 0.614 |
| Experimental Ex. No. 26 | 1 | 1 | 1 | 0.25 | 0.05 | 700 | Formic Acid | Nitric Acid | 4.0 | 30 | 8.0 | 0.582 |
| Experimental Ex. No. 27 | 1 | 1 | 1 | 0.25 | 0.05 | 900 | Formic Acid | Nitric Acid | 4.6 | 27 | 5.5 | 0.598 |
| Experimental Ex. No. 28 | 1 | 1 | 1 | 0.25 | 0.05 | 800 | None | Nitric Acid | 4.4 | 29 | 16.0 | 0.549 |

In claim 1, column 15, line 10, "C." should read --C--.

In claim 8, column 15, line 47, "of dropping" should read --dropping--.

In claim 8, column 15, line 56, "C." should read --C--.

In claim 9, column 16, line 16, "C." should read --C--.

In claim 12, column 16, line 44, "comprise" should read --comprises--.

In claim 13, column 16, line 49, "C." should read --C--.